(12) United States Patent
Yamada et al.

(10) Patent No.: US 7,864,135 B2
(45) Date of Patent: Jan. 4, 2011

(54) MULTI-DISPLAY SYSTEM AND DISPLAY METHOD

(75) Inventors: Norihiko Yamada, Okaya (JP); Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 793 days.

(21) Appl. No.: 11/774,150

(22) Filed: Jul. 6, 2007

(65) Prior Publication Data
US 2008/0036691 A1  Feb. 14, 2008

(30) Foreign Application Priority Data
Aug. 8, 2006 (JP) .............................. 2006-215388

(51) Int. Cl.
*G09G 5/00* (2006.01)
(52) U.S. Cl. ..................... 345/1.1; 345/2.2; 345/2.3
(58) Field of Classification Search .............. 345/1.1–9, 345/204–215
See application file for complete search history.

(56) References Cited

U.S. PATENT DOCUMENTS 7,411,568 B2 * 8/2008 Kizaki ..................... 345/2.2

| | | | |
|---|---|---|---|
| 2003/0098820 A1 * | 5/2003 | Someya et al. | 345/1.3 |
| 2003/0197659 A1 * | 10/2003 | Arai | 345/1.1 |
| 2004/0227692 A1 * | 11/2004 | Yoon | 345/3.1 |
| 2005/0084234 A1 | 4/2005 | Ejiri | |
| 2006/0145941 A1 * | 7/2006 | Park et al. | 345/1.1 |

FOREIGN PATENT DOCUMENTS

| | | |
|---|---|---|
| JP | A-2001-242435 | 9/2001 |
| JP | A-2005-124054 | 5/2005 |
| JP | A 2005-250445 | 9/2005 |

* cited by examiner

*Primary Examiner*—Vijay Shankar
(74) *Attorney, Agent, or Firm*—Oliff & Berridge, PLC

(57) ABSTRACT

A multi-display system is provided. The system includes a plurality of display devices that each display a partial image being at least a part of an original image of a screen. Each of the plurality of display devices include a plurality of signal input channels that are each provided with an input terminal for receiving image information about the original image or the partial image, and are each set in accordance with a signal format of the provided image information; an input channel selection section that selects any of the signal input channels in accordance with a predetermined control command, and makes an input of the image information via the selected signal input channel; and a display control section that applies, in accordance with the predetermined control command, predetermined image processing to the received image information, and makes a display section display thereon the partial image.

11 Claims, 13 Drawing Sheets

MULTI-DISPLAY SYSTEM AND DISPLAY METHOD

BACKGROUND

1. Technical Field

The present invention relates to a multi-display system and a display method.

2. Related Art

A multi-display system of a previous type includes a plurality of display devices, e.g., projectors, each display a partial image being at least a part of an original image of a screen, and the display devices each display its own partial image so that the original image is displayed on a large-sized screen. For example, refer to JP-A-2005-250445.

With the technology of JP-A-2005-250445, each of the display devices is connected with a rendering unit exemplified by a personal computer (PC) or others. The rendering unit serves to read video data from a video data storage device being a storage medium such as hard disk and DVD (Digital Versatile Disc). Thus read video data is subjected to color processing, resolution conversion, or others, and the processing result is output to each of the display devices. Based on the video data provided by the corresponding rendering unit as such, the display devices each display thereon its own partial image.

With the technology of JP-A-2005-250445, a signal input channel is fixed for each of the display devices, and is used with restrictions for video sources in terms of type, application use, or others. That is, mainly assumed is the application use for displaying an original image with high resolution using the rendering units. With such a technology, due to the time required for communications processing between a video distribution server and the rendering units, and due to the time required for a rendering processing of the rendering units, a delay easily occurs. There is thus a problem of not being suitable for any application use of placing an importance on the real-time characteristics, i.e., responsivity, of slide image display or others during presentations.

SUMMARY

An advantage of some aspects of the invention is to provide a multi-display system and a display method being available for various types of application uses, and achieving the increase of customer convenience.

According to an aspect of the invention, a multi-display system includes: a plurality of display devices that each display a partial image being at least a part of an original image of a screen, display the original image by the partial images, and include: a plurality of signal input channels that are each provided with an input terminal for receiving image information about the original image or the partial image, and are each set in accordance with a signal format of the provided image information; an input channel selection section that selects any of the signal input channels in accordance with a predetermined control command, and makes an input of the image information via the selected signal input channel; and a display control section that applies, in accordance with the predetermined control command, predetermined image processing to the received image information, and makes a display section to display thereon the partial image; and a control device that exercises control over the display devices by providing the display devices with the predetermined control command, that acquires mode selection information indicating which of a plurality of display modes is selected in accordance with an application use of the multi-display systems, that outputs the predetermined control command to the display devices based on the acquired mode selection information, and that makes the input channel selection section of each of the display devices select any of the signal input channels corresponding to the mode selection information, and display the partial image in the display mode corresponding to the mode selection information.

In the aspect of the invention, the multi-display system is provided with a plurality of signal input channels, an input channel selection section, a plurality of display devices each including a display control section, and a control device for control over the display devices. With such a configuration, the multi-display system operates with whichever display mode in accordance with the application use thereof.

For example, a user of the multi-display system makes a setting, for input to the control device, of mode selection information indicating to select a display mode based on his or her wanting application use. The control device then acquires the mode selection information in response to the setting input made by the user. Based on the mode selection information, the control device then forwards a predetermined control command to a plurality of display devices.

In accordance with the control command provided by the control device as such, the display devices each select any of a plurality of signal input channels corresponding to the display mode selected by the user. The display devices are each accordingly provided with image information about an original image or a partial image via the signal input channel selected thereby. The display devices then each apply predetermined image processing to the received image information in accordance with the control command provided by the control device. When the received image information is about an original image, i.e., original image information, in accordance with the control command from the control device, each of the display devices cut out at least partially the original image information so that partial image information is formed. The resulting partial image information is then subjected to gamma correction, i.e., a partial image information generation process, and an image correction process. When the received image information is the partial image information, the display devices each apply gamma correction or others thereto in accordance with the control command from the control device, i.e., the image correction process. The display devices then each display, on its display section, a partial image based on its received partial image information through with the image processing.

With such a configuration, only by the user selecting a display mode in accordance with his or her wanting application use, the multi-display system operates as described above. The multi-display system is thus available for various types of application uses, e.g., when the real-time characteristics are required for use for presentations or others, when the display of an original image is made with a high resolution, or when the multi-display system is desirably operated with small resources, thereby favorably increasing the customer convenience.

For example, using projectors for the display devices enables to minimize the need for adding any new hardware so that the multi-display system can be implemented with low cost. This is because a general projector is equipped with a plurality of signal input channels, and utilizing the signal input channels of the projector effectively will derive such effects.

In the aspect of the invention, preferably, the multi-display system further includes an image signal output device that outputs the image information to each of the display devices as a first video signal. In the multi-display system, the control device outputs, when acquiring the mode selection information indicating to select a real time mode from the display modes, the predetermined control command to the display devices, and makes the input channel selection section of each of the display devices select any of the input channels for the first video signal corresponding to the real time mode, and display the partial image in the real time mode, and in each of the display devices, the signal input channels are each configured to include a first video signal input channel for use to receive the first video signal provided by the image signal output device, and in accordance with the predetermined control command when the control device acquires the mode selection information indicating to select the real time mode, the input channel selection section selects the first video signal input channel, and makes an input of the first video signal, and the display control section generates the partial image by applying an image data cut-out process to the first video signal, and makes the display section display thereon the partial image.

Herein, the image signal output device is exemplified by a PC, a television tuner, a DVD (Digital Versatile Disc) player, or others.

The first video signal input channel is exemplified by a component signal input channel, S (Separate) signal input channel, a composite signal input channel, an analog RGB signal input channel, a digital signal input channel DVI (Digital Visual Interface), or others, which all serve to receive a first video signal coming from the image signal output device described above.

In the aspect of the invention, when a user selects a real time mode for a display mode in accordance with his or her wanting application use, for example, as will be described below, the multi-display system accordingly operates in the real time mode.

That is, in response to an incoming user-made setting, the control device acquires mode selection information related to the real time mode. Based on the mode selection information, the control device then forwards a predetermined control command to a plurality of display devices.

In accordance with the control command provided by the control device as such, the display devices each select a first video signal input channel from a plurality of signal input channels. Through the selected first video signal input channel, a first video signal provided by the image signal output device is provided. Thereafter, the display devices each apply A/D (Analog/Digital) conversion or others to the first video signal so that a digital signal, i.e., image information, is derived. The display devices then apply the above-described image processing, i.e., both the partial image information generation process and the image correction process, or only the image correction process, to the image information in accordance with the control command provided by the control device. The display devices then each display, on its display section, its own partial image based on the partial image information through with the image processing as such.

As described above, the multi-display system is so operated as to go through signal processing for the hierarchy of the first video signal, and there thus is no need for data conversion such as compression and decoding during the operation. As such, a delay is not caused that much, and if for a presentation using a slide file on a notebook PC selected for use as the image signal output device, a user finds a good response when he or she makes a screen change through operation of the notebook PC, for example. That is, with the real time mode selected from a plurality of display modes, the multi-display system can work optimally when the real-time characteristics are required for a presentation or others.

Moreover, the multi-display system is operated with low cost in terms of power consumption because, unlike previous systems, rendering units do not always operate when the multi-display system is in operation.

In the aspect of the invention, preferably, the multi-display system further includes: a plurality of rendering devices that each form partial image information about the partial image based on the image information, apply predetermined image processing to the partial image information, and output the partial image information through with the image processing to each of the display devices as a second video signal. In the multi-display system, the control device outputs, when acquiring the mode selection information indicating to select a high performance mode from the display modes, the predetermined control command to the display devices, and makes the input channel selection section of each of the display devices select the input channel for the second video signal corresponding to the high performance mode, and display the partial image in the high performance mode, and in each of the display devices, the signal input channels are each configured to include a second video signal input channel for use to receive the second video signal provided by any of the corresponding rendering devices, and in accordance with the predetermined control command when the control device acquires the mode selection information indicating to select the high performance mode, the input channel selection section selects the second video signal input channel, and makes an input of the second video signal, and the display control section makes the display section display thereon the partial image being the second video signal.

The rendering device here is exemplified by a personal computer.

The second video signal input channel is exemplified by an analog RGB signal input channel, a digital signal input channel (DVI), or others, which all serve to receive a second video signal coming from the above-described rendering devices.

In the aspect of the invention, when a user selects a high performance mode for a display mode in accordance with his or her wanting application use, for example, as will be described below, the multi-display system accordingly operates in the high performance mode.

That is, in response to an incoming user-made setting, the control device acquires mode selection information related to the high performance mode. Based on the mode selection information, the control device then forwards a predetermined control command to a plurality of display devices.

In accordance with the control command provided by the control device as such, the rendering devices each form partial image information about a partial image based on the image information, and apply predetermined image processing to the partial image information, e.g., image processing of changing pixel color, intensity, resolution, or others. The rendering devices then each forward, as a second video signal, the partial image information through with the image processing as such to a plurality of display devices.

In accordance with the control command from the control device, the display devices each select a second video signal input channel from a plurality of signal input channels. Through the selected second video signal input channel, the second video signal provided by each of the rendering device is input. Thereafter, the display devices each apply A/D (Analog/Digital) conversion or others to the second video signal so that a digital signal, i.e., partial image information, is derived. The display devices then apply gamma correction or others to the partial image information in accordance with the control command provided by the control device. The display devices then each display, on its display section, a partial image based on the partial image information through with gamma correction or others.

With such a configuration, the rendering devices (personal computers) are each capable of graphic processing, and thus can apply high-accuracy image processing to original image information or the partial image information so that the resulting partial image information can be of high resolution. That is, because each of the display devices displays a partial image based on the high-resolution partial image information, the entire screen as an assembly of a plurality of partial screens can display thereon an original image with higher resolution. That is, with the high performance mode selected from a plurality of display modes, the multi-display system can work optimally when the original image is to be displayed with high resolution.

For example, using personal computers as the rendering devices enables, with ease, addition of functions, e.g., software addition and update, after the multi-display system is constructed.

In the aspect of the invention, preferably, the multi-display system further includes a network to enable transmission of the image information to the display devices as a first digital signal. In the multi-display system, the control device outputs, when acquiring the mode selection information indicating to select a first simple mode from the display modes, the predetermined control command to the display devices, makes the input channel selection section of each of the display devices select the input channel for the network corresponding to the first simple mode, and display the partial image in the first simple mode, in each of the display devices the signal input channels are each configured to include a network input channel for use to receive the first digital signal over the network, and in accordance with the predetermined control command when the control device acquires the mode selection information indicating to select the first simple mode, the input channel selection section selects the network input channel, and makes an input of the first digital signal, and the display control section generates the partial image by applying an image data cut-out process to the first digital signal, and makes the display section display thereon the partial image.

Herein, the network is exemplified by a LAN (Local Area Network). The multi-display system is not restricted to be wired by LAN cable or others, and may be wireless such as radio LAN.

In the aspect of the invention, when a user selects a first simple mode for a display mode in accordance with his or her wanting application use, for example, as will be described below, the multi-display system accordingly operates in the first simple mode.

That is, in response to an incoming user-made setting, the control device acquires mode selection information related to the first simple mode. Based on the mode selection information, the control device then forwards a predetermined control command to a plurality of display devices.

In accordance with the control command provided by the control device as such, the display devices each select a network input channel from a plurality of signal input channels. Over the network and through the selected network input channel, a first digital signal in provided. Thereafter, the display devices each apply decoding or others to the first digital signal, i.e., image information, and to the image information received in accordance with the control command from the control device, apply the above-described image information, i.e., both the partial image information genera-tion process and the image correction process, or only the image correction process. The display devices then each display, on its display section, a partial image based on the partial image information through with the image processing as such.

With such a configuration, because there is no need to use the rendering devices or others as described above, i.e., there is no need to turn on the rendering devices, the multi-display system can be operated with low cost in terms of power consumption. Accordingly, with the first simple mode selected from a plurality of display modes, the multi-display system can work optimally when the multi-display system is desirably operated with small resources.

Moreover, the image information is input as a digital signal to each of the display devices over the network, thereby causing no signal degradation that is often caused to analog video signals by cable leading.

In the above aspect of the invention, preferably, the multi-display system further includes a plurality of storage devices that each store the image information, and output the image information to each of the display devices as a second digital signal. In the multi-display system, the control device outputs, when acquiring the mode selection information indicating to select a second simple mode from the display modes, the predetermined control command to the display devices, makes the input channel selection section of each of the display devices select the input channel for the storage devices corresponding to the second simple mode, and display the partial image in the second simple mode, and in each of the display devices, the signal input channels are each configured to include a storage input channel for use to receive the second digital signal provided from any of the corresponding storage devices, and in accordance with the predetermined control command when the control device acquires the mode selection information indicating to select the second simple mode, the input channel selection section selects the storage input channel, and makes an input of the second digital signal, and the display control section generates the partial image by applying an image data cut-out process to the second digital signal, and makes the display section display thereon the partial image.

Herein, the storage device is exemplified by a hard disk or a USB memory ready for USB (Universal Serial Bus).

In the aspect of the invention, when a user selects a second simple mode for a display mode in accordance with his or her wanting application use, for example, as will be described below, the multi-display system accordingly operates in the second simple mode.

That is, in response to an incoming user-made setting, the control device acquires mode selection information related to the second simple mode. Based on the mode selection information, the control device then forwards a predetermined control command to a plurality of display devices.

In accordance with the control command provided by the control device as such, the display devices each select a storage input channel from a plurality of signal input channels. Through the selected storage input channel, the image information stored in a storage device is provided as a second digital signal. Thereafter, the display devices each apply decoding or others to the second digital signal, i.e., image information, and to the image information received in accordance with the control command from the control device, apply the above-described image information, i.e., both the partial image information generation process and the image correction process, or only the image correction process. The display devices then each display, on its display section, a partial image based on the partial image information through with the image processing as such.

With such a configuration, because there is no need to use the rendering devices or others as described above, i.e., there is no need to turn on the rendering devices, the multi-display system can be operated with low cost in terms of power consumption. Accordingly, with the second simple mode selected from a plurality of display modes, the multi-display system can work optimally when the multi-display system is desirably operated with small resources.

Moreover, the image information is forwarded as a digital signal to each of the display devices, thereby causing no signal degradation that is often caused to analog video signals by cable leading.

What is more, the multi-display system can be implemented only by the display devices, the storage devices, and the control device. Accordingly, if with an application use not requiring frequent content change, the multi-display system can be operated with lower cost.

According to another aspect of the invention, a display method using a multi-display system in which the multi-display system includes: a plurality of display devices that each display a partial image being at least a part of an original image of a screen, and display the original image with the partial images displayed by the remaining display devices; and a control device that exercises control over the display devices, and the display method includes: acquiring, by the control device, mode selection information indicating to select any of a plurality of display modes in accordance with an application use of the multi-display system; outputting, by the control device, a control command to the display devices based on the acquired mode selection information; selecting, by each of the display devices, in accordance with the control command from the control device, any of a plurality of signal input channels corresponding to the selected display mode; receiving, by each of the display devices, image information about the original image or the partial image via the selected signal input channel; and applying, by each of the display devices, predetermined image processing to the provided image information for display, on a display section, of the partial image in the selected display mode.

The display method of the above aspect of the invention is to be executed by the multi-display system described above, and thus can have the same effects and advantages as the multi-display system described above.

BRIEF DESCRIPTION OF THE DRAWINGS

The invention will be described with reference to the accompanying drawings, wherein like numbers reference like element.

DESCRIPTION OF EXEMPLARY EMBODIMENT

In the below, an embodiment of the invention is described by referring to the accompanying drawings.

Entire Configuration of Multi-Display System

Figure 1:
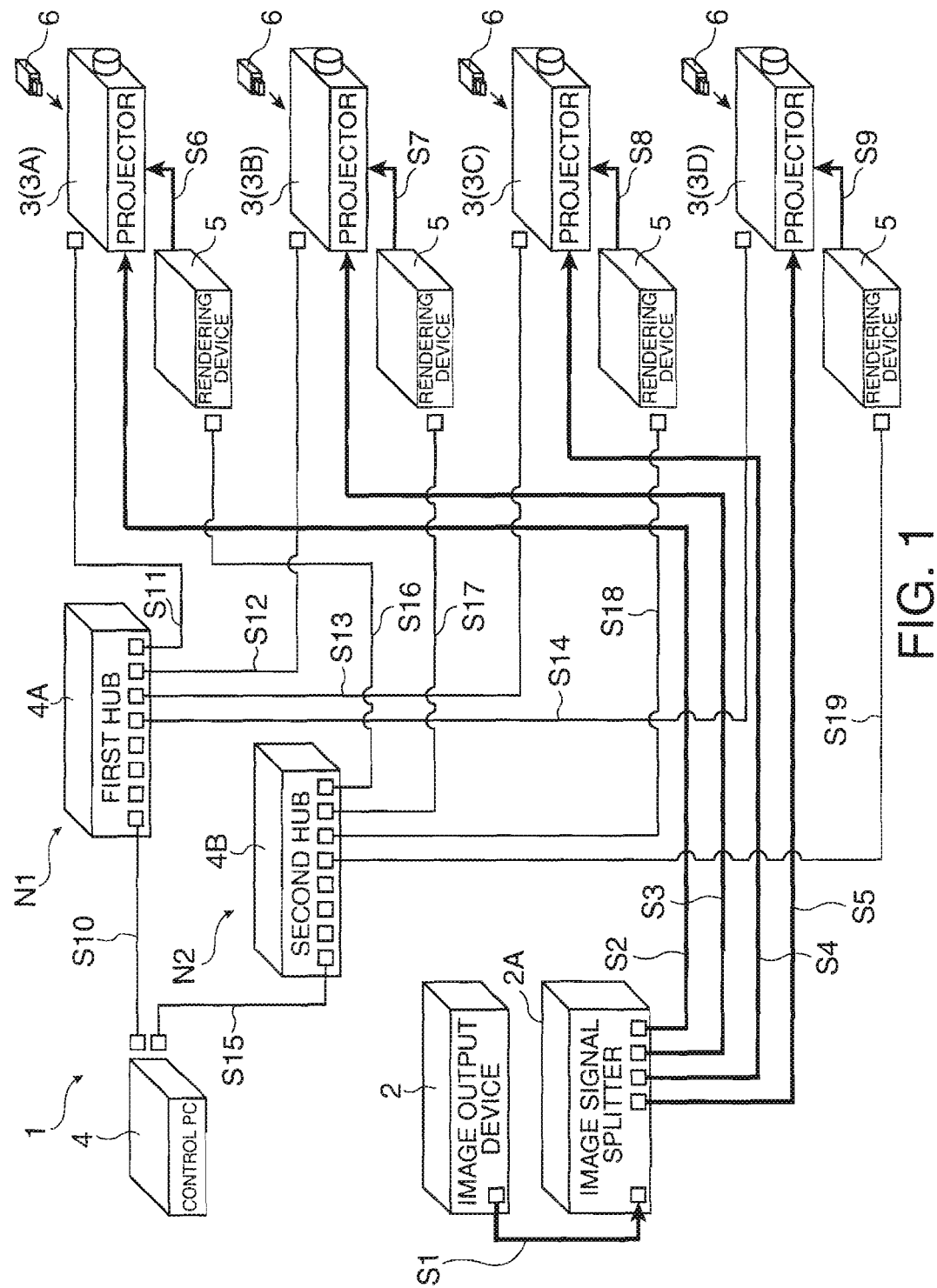
FIG. 1 is a diagram showing the configuration of a multi-display system of an embodiment of the invention.

FIG. 1 is a diagram showing the configuration of a multi display system 1.

The multi-display system 1 enables tiling display of a large-screen image, i.e., original image, with a plurality of display modes in accordance with what is an application use thereof. As shown in FIG. 1, this multi-display system 1 is configured, mainly, to include an image output device 2, a plurality of projectors 3 each being a display device, a control PC 4 being a control device, and a plurality of rendering devices 5. In this embodiment, four of the projector 3, i.e., 3A, 3B, 3C, and 3D, are provided with two in the longitudinal direction and two in the in the lateral direction, i.e., 2×2 configuration, and as with four projectors 3 as above, four of the rendering device 5 are provided.

The image output device 2 outputs, utilizing the multi-display systems 1, original image data, i.e., original image information, about an original image as a first video signal. The original image data is used for display an image, i.e., original image. For this image output device 2, various types of devices can be used, e.g., personal computer, television tuner, DVD player, or others.

This image output device 2 is connected to each of the projectors 3 via an image signal splitter 2A.

This image signal splitter 2A is connected with the image output device 2 over a signal line S1, and outputs, in parallel, a first video signal to each of the projectors 3. The first video signal is the one provided by the image output device 2 over the signal line S1. For this image signal splitter 2A, for example, used is a general-purpose image signal splitter, which serves to output, in parallel, a first video signal provided by the image output device 2 to each of the projectors 3. This signal output is made via a video buffer amplifier that is for keeping the signal level.

That is, the image output device 2 and the image signal splitter 2A are each corresponding to the image signal output device of the aspects of the invention.

Figure 2:
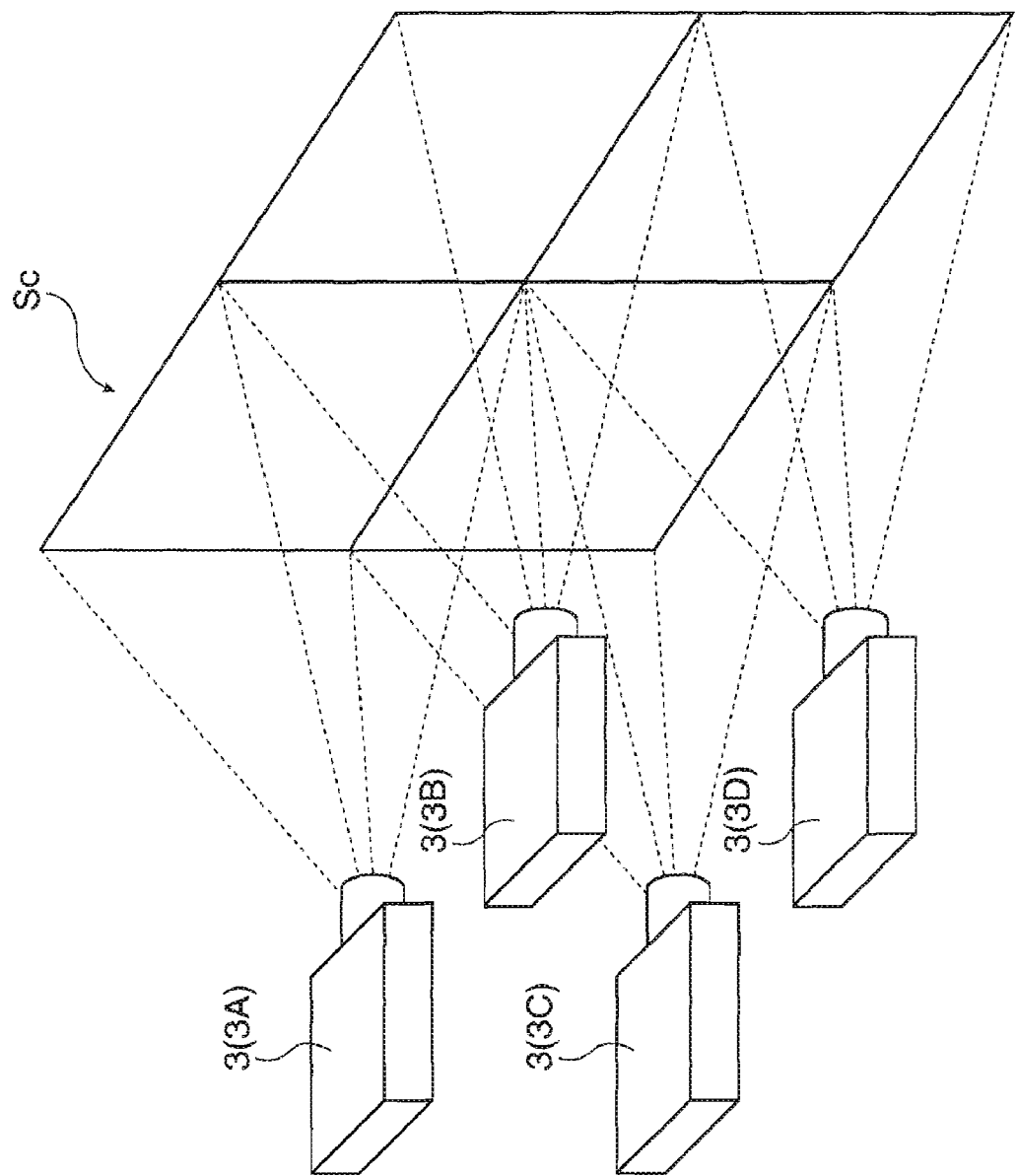
FIG. 2 is a diagram showing an original image with tiling display with a plurality of partial images being results of extended projection by projectors of the embodiment.

FIG. 2 is a diagram showing an original image with tiling display with a plurality of partial images being results of extended protection by the projectors 3.

Figure 3:
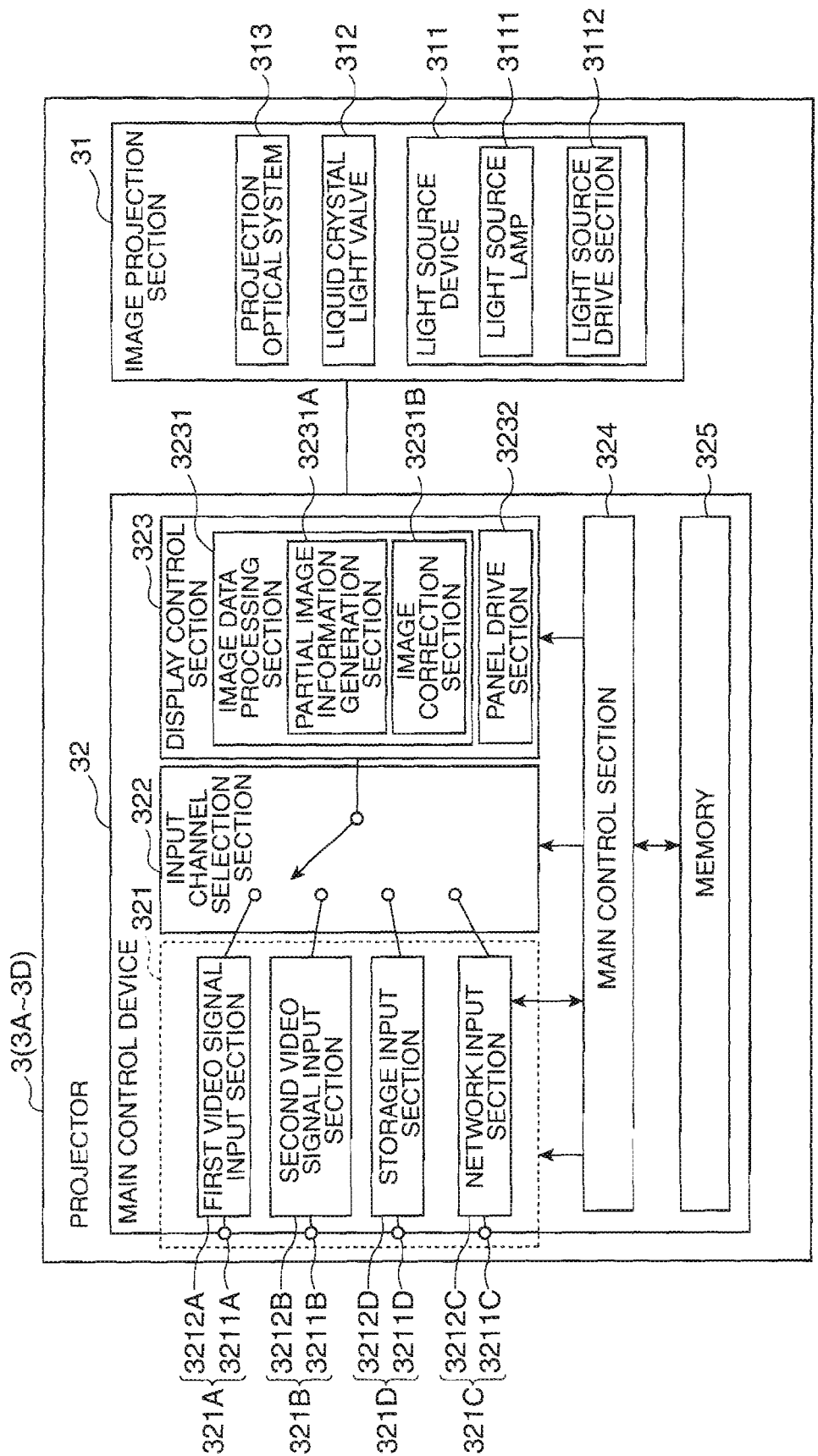
FIG. 3 is a block diagram showing the configuration of the projector of the embodiment.

FIG. 3 is a block diagram showing the configuration of one of the projectors 3.

The projectors 3 each apply predetermined image processing to image data, i.e., image information, about any incoming original image or partial image. Based on the image information through with the image processing as such, the projectors 3 each form an image light, i.e., a partial image, by optically processing luminous fluxes coming from a light source, and thus formed image lights are extended and projected on a screen Sc (FIG. 2).

Although not specifically shown, in this embodiment, the screen Sc is of a translucent type through which an incoming image light passes for projection. Alternatively, the screen Sc may be of a reflective type on which an incoming image light is projected after reflected.

In this embodiment, among the four projectors 3A to 3D, as shown in FIG. 2, the projector 3A is so disposed as to take charge of the upper left portion of the screen Sc for extended projection of an image light, i.e., partial image, when viewed from the rear surface side of the screen Sc, i.e., opposite side from the viewer's side. As shown in FIG. 2, the projector 3B is so disposed as to take charge of the upper right portion of the screen Sc for extended projection of an image light, i.e., partial image, when viewed from the rear surface side of the screen Sc. As shown in FIG. 2, the projector 3C is so disposed as to take charge of the lower left portion of the screen Sc for extended projection of an image light, i.e., partial image, when viewed from the rear surface side of the screen Sc. As shown in FIG. 2, the projector 3D is so disposed as to take charge of the lower right portion of the screen Sc for extended projection of an image light, i.e., partial image, when viewed from the rear surface side of the screen Sc.

In this embodiment, as shown in FIG. 2, the image lights, i.e., partial images, being the results of the extended projection from the projectors 3A to 3D are assumed as configuring an original image without overlapping.

Also in this embodiment, the four projectors 3A to 3D are assumed as being all configured the same, and in the below, one projector 3 is mainly described. This projector 3 is configured by, mainly, an image projection section 31 serving as a display section and a main control device 32 as shown in FIG. 3.

The image projection section 31 forms an image light under the control of the main control device 32 for extended projection onto the screen Sc. As shown in FIG. 3, this image projection section 31 is configured to include a light source device 311, a liquid crystal light valve 312 being an optical modulator, a projection optical system 313, or others.

The light source device 311 emits luminous fluxes toward the liquid crystal light valve 312 under the control of the main control device 32. This light source device 311 is provided with a light source lamp 3111 and a light source drive section 3112.

The light source lamp 3111 is configured by an extra-high-pressure mercury lamp, but the extra-high-pressure mercury lamp is not the only option, and any other light source lamps of discharge emission will do, e.g., metal halide lamp and xenon lamp. Moreover, the light source lamp of discharge emission is not restrictive, and various types of self-emitting devices are also possibilities, e.g., light-emitting diode, laser diode, organic EL (Electroluminescence) device, and silicon light-emitting device.

The light source drive section 3112 drives the light source lamp 3111 with a predetermined driving voltage under the control of the main control device 32.

The liquid crystal light valve 312 is a liquid crystal panel of a translucent type. Based on a drive signal from the main control device 32, the liquid crystal light valve 312 changes the alignment of liquid crystal molecules sealed in a liquid crystal cell (not shown), and passes through or block the luminous fluxes emitted from the light source lamp 3111 so that image lights corresponding to the drive signal are emitted to the projection optical system 313.

The projection optical system 313 extends and projects the image light provided by the liquid crystal light valve 312 toward the screen Sc.

Although not shown, the number of the liquid crystal light valves 312 provided to the projector 3 is three to correspond to three colors of RGB, and the light source device 311 is provided with a color separation optical system that separates a light source light into three colors of lights. The projection optical system 313 is provided with a color combining optical system of combining the image lights of three colors, and generating an image light of a color image. Note here that such optical systems can be configured as those in a general projector varying in type.

The main control device 32 is configured to include a main control section 324 such as CPU (Central Processing Unit), and exercises control over the projector 3 in its entirety by following the control command from the control PC 4 and a control program stored in a memory 325. This main control device 32 is provided with, in addition to the main control section 324 and the memory 325, a plurality of signal input channels 321, an input channel selection section 322, a display control section 323, or others.

The signal input channels 321 are each set in accordance with the format of an incoming signal, and are each a portion of receiving video and digital signals. As shown in FIG. 3, these signal input channels 321 include a first video signal input channel 321A, a second video signal input channel 321B, a network input channel 321C, and a storage input channel 321D.

The first video signal input channel 321A is a portion of receiving a first video signal, e.g., component signal, S signal, composite signal, analog RGB signal, digital signal, or others. As shown in FIG. 3, the first video signal input channel 321A is provided with a first video signal input terminal 3211A and a first video signal input section 3212A. The fist video signal input section 3212A applies predetermined signal processing to the first video signal received via the first video signal input terminal 3211A, and outputs the processing result.

The first video signal input terminal 3211A is exemplified by a terminal for use with various types of general projectors, e.g., computer/component video terminal (Dsub terminal or others), S-video terminal (D terminal or others), video input terminal (1RCA terminal, 3RCA terminal, 5RCA terminal, or others) and DVI terminal. In this embodiment, the first video signal input terminal 3211A of each of the projectors 3 is connected with the image signal splitter 2A over signal lines S2 to S5 (FIG. 1).

The first video signal input section 3212A applies A/D conversion or others to a component signal and an analog RGB signal, and outputs the result as a digital signal. To an S signal or a composite signal, the first video signal input section 3212A applies A/D conversion or others after converting it to a component signal, and outputs the result as a digital signal. To a digital signal, the first video signal input section 3212A applies standard-compliant signal processing, i.e., decoding, before output.

The second video signal input channel 321B is a portion of receiving a second video signal, e.g., an analog RGB signal and a digital signal. As shown in FIG. 3, the second video signal input channel 321B is provided with a second video signal input terminal 3211B and a second video signal input section 3212B. The second video signal input section 3212B applies predetermined signal processing to the second video signal received via the second video signal input terminal 3211B, and outputs the processing result.

The second video signal input terminal 3211B is exemplified by a terminal for use with various types of general projectors, e.g., computer/component video terminal (Dsub terminal or others), and DVI terminal. In this embodiment, the second video signal input terminal 3211B of each of the projectors 3 is connected with each of the rendering device 5 over signal lines S6 to S9 (FIG. 1).

The second video signal input section 3212B applies A/D conversion or others to an analog RGB signal, and outputs the result as a digital signal. To a digital signal, the second video signal input section 3212B applies standard-compliant signal processing, i.e., decoding, before output.

The network input channel 321C is a portion of receiving a digital signal over a network N1 (FIG. 1). As shown in FIG. 3, the network input channel 321C is provided with a network input terminal 3211C and a network input section 3212C. The network input section 3212C applies, to a digital signal received via the network input terminal 3211C, network-standard-compliant signal processing, i.e., decoding, before output.

The network input terminal 3211C is exemplified by a terminal for use with various types of general projectors, e.g., 100 BASE-T/10 BASE-T terminal for use to establish a connection with a LAN cable, and a card slot for enabling attachment of a LAN card or others. In this embodiment, the network input terminal 3211C of each of the projectors 3 is connected to the control PC 4 over the network N1, i.e. signal lines S10 to S14 (FIG. 1) including a first hub 4A, a LAN cable, of others.

As shown in FIG. 3, the network input section 3212C is connected to the main control section 324 to be able to transmit any predetermined information therewith. That is, when receiving a control command provided by the control PC 4 over the network N1, the network input section 3212C is so configured as to apply signal processing thereto before output to the main control section 324.

The storage input channel 321D is a portion of receiving image data stored in any external storage device, i.e., original image data about an original image (original image information), or partial image data about a partial image (partial image information). As shown in FIG. 3, the storage input channel 321D is provided with a storage input terminal 3211D and a storage input section 3212D. The storage input section 3212D applies, to a digital signal received over the storage input terminal 3211D, interface-standard-compliant, e.g., USB standard, signal processing, i.e., decoding, before output.

The storage input terminal 3211D is exemplified by a terminal for use with various types of general projectors, e.g., USB terminal for establishing a connection with a hard disk and a USB memory that are USB-ready storage device. In this embodiment, the storage input terminal 3211D of each of the projectors 3 can be connected with a USB memory 6 (FIG. 1) being a storage device storing therein the original image data or the partial image data.

In response to a control signal from the main control section 324, the input channel selection section 322 selects any of the signal input channels 321, and receives signals over thus selected signal input channel.

The display control section 323 is a portion of exercising drive control over the liquid crystal light valves 312 in accordance with the control signal from the main control section 324. More specifically, the display control section 323 applies predetermined processing to a digital signal received over the signal input channel 321 selected by the input channel selection section 323, and outputs a drive signal corresponding to the image data being a processing result to the liquid crystal light valves 312 so that an image lights i.e., partial image, is formed to each of the liquid crystal light valves 312. The digital signal here is original image data about an original image (original image information) or partial image data about a partial image (partial image information). As shown in FIG. 3, the display control section 323 is provided with an image data processing section 3231, a panel drive section 3232, or others.

The image data processing section 3231 performs, as appropriate, various types of image data processing in accordance with the control signal coming from the main control section 324. The image data processing includes, for example, a partial image data generation process of generating partial image data from the digital signal (original image data) received through the signal input channel 321, and an image data correction process such as gamma correction for the generated partial image data or the digital signal (partial image data) received through the signal input channel 321. As shown in FIG. 3, this image data processing section 3231 is provided with a partial image information generation section 3231A, an image correction section 3231B, or others. Although not shown specifically, the image data processing section 3231 includes an image data storage section (not shown) for use as a storage area at the time of the above-described image data processing. This image data storage section is a portion of buffering the received image data, and may be a frame buffer for storing every image data of a screen, a line buffer for storing scanning data of a horizontal line, or others.

The partial image information generation section 3231A performs an image data cut-out process and an image size change process in accordance with the control signal from the main control section 324, and generates partial image data, i.e., performs the partial image data generation process. The image data cut-out process is of cutting out image data of a predetermined area from the original image data, and the image size change process is of changing the size of the image data of the predetermined area being the cut-out result.

The image correction section 3231B performs, as appropriate, the image data correction process such as gamma correction using an image correction parameter stored in the memory 325. This image data correction process is applied to the partial image data generated by the partial image information generation section 3231A, or to the partial image data provided through the signal input channel 321.

The panel drive section 3232 generates a drive signal from the partial image data being the processing result of the image data processing section 3231 for use to drive the liquid crystal light valves 312, and forwards the drive signal to the liquid crystal light valves 312 so that a partial image, i.e., image light, is formed thereto.

Figure 4:
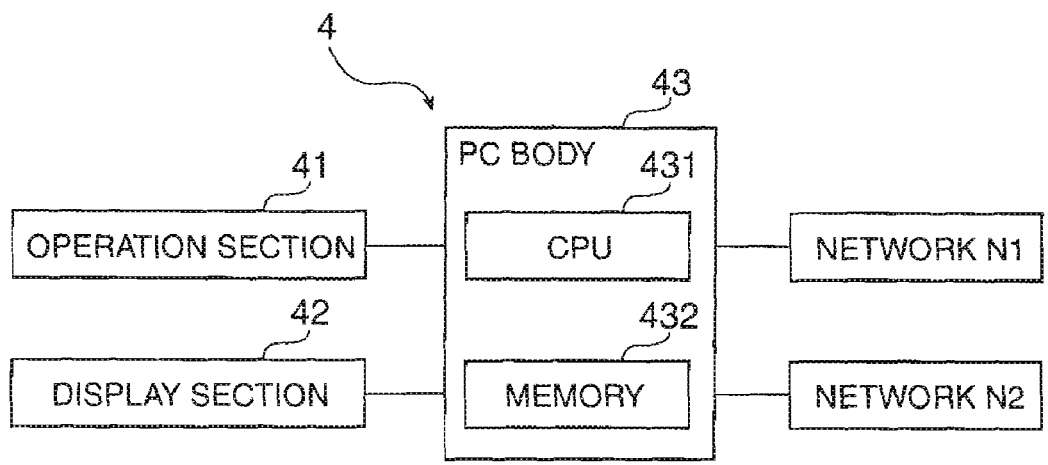
FIG. 4 is a block diagram showing the configuration of a control PC of the embodiment.

FIG. 4 is a block diagram showing the configuration of the control PC 4.

The control PC 4 is configured by a general personal computer including a CPU, a hard disk, or others, and exercises control over the projectors 3 and the rendering devices 5 over the network N1, and a network N2. The control PC 4 also supplies the original image data, i.e., original image information, and the partial image data, i.e., partial image information, to the projectors 3 and the rendering devices 5 over the networks N1 and N2. As shown in FIG. 4, this control PC 4 is configured to include an operation section 41, a display section 42, a PC body 43, or others.

The operation section 41 includes various types of operation buttons for input operation using a keyboard, a mouse, or others. When these operation buttons are operated for input, the PC body 43 is accordingly operated, and a setting is made to the operation details of the PC body 43 using information displayed on the display section 42, for example. In this embodiment, through input operation of the operation buttons in the operation section 41, various types of display modes can be selected in accordance with the application use of the multi-display system 1. The display modes include a real time mode, a high performance (Whole) mode, a high performance (Partial) mode, a first simple (Whole) mode, a first simple (Partial) mode, a second simple (Whole) mode, and a second simple (Partial) mode. Through input operation of the operation section 41 by a user using the multi-display system 1, a predetermined operation signal, i.e., mode selection information, is forwarded to the PC body 43 from the operation section 41 as appropriate.

Note that, to make settings for various requirements to the operation section 41, the input operation of the operation buttons is not the only option, and alternatively, the operation section 41 may be configured to be able to be operated using a touch panel, by audio, or others for input operation.

The display section 42 is under the control of the PC body 43, and displays thereon any predetermined information. The display section 42 displays, for example, as appropriate, a part of an original image to be entirely displayed using the multi-display system 1, information being the processing result of the PC body 43, data provided by the PC body 43 from the memory through input operation of the operation section 41 for setting or updating information to be stored in the memory of the PC body 43. This display section 42 is a liquid crystal display, an organic EL display, PDP (Plasma Display Panel), CRT (Cathode-Ray Tube), or others.

As shown in FIG. 4, the PC body 43 is configured to include a CPU 431, and in accordance with the input of an operation signal from the operation section 41, runs a control program stored in the memory 432.

More specifically, the PC body 43 is connected to the networks N1 and N2 by a network interface (not shown), and in accordance with the input of an operation signal, i.e., mode selection information, from the operation section 41, transmits any predetermined control command, original image data, or partial image data over the networks N1 and N2.

The control command, the original image data, or the partial image data from the control PC 4 is forwarded to each of the projectors 3 over the network N1, i.e., the first hub 4A, and signal lines S10 to S14. The control command, the original image data, or the partial image data from the control PC 4 is also forwarded to each of the rendering devices 5 over the network N2, i.e., a second hub 4B and signal lines S15 to S19.

Figure 5:
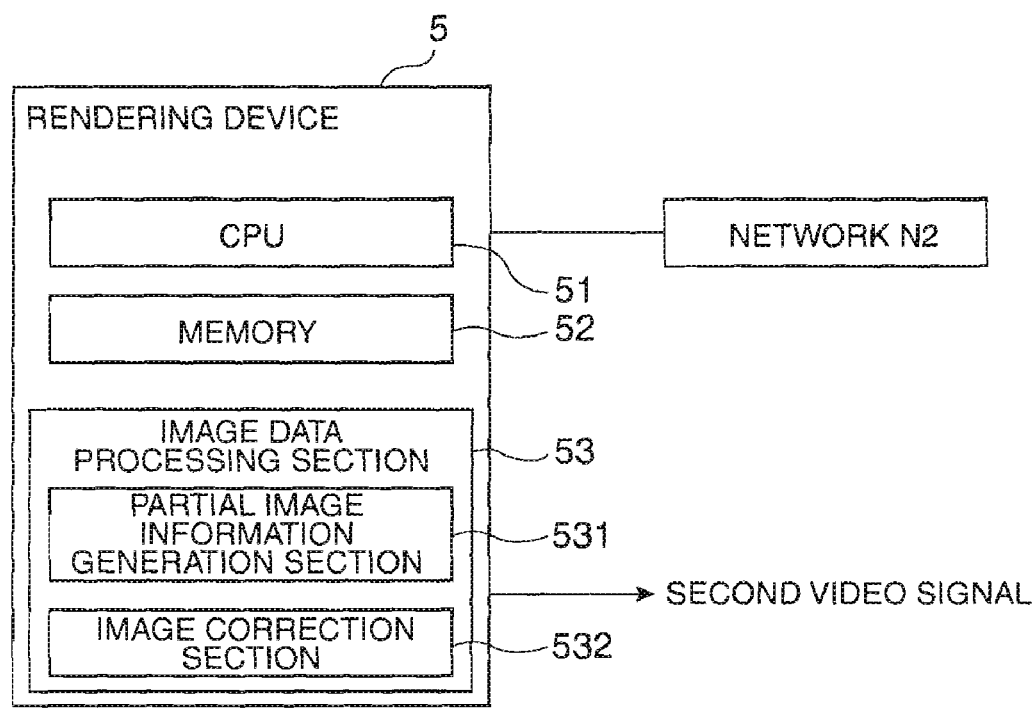
FIG. 5 is a block diagram showing the configuration of a rendering device of the embodiment.

FIG. 5 is a block diagram showing the configuration of one of the rendering devices 5.

The rendering devices 5 are each configured by a personal computer as is the control PC 4, and is connected to the network N2 by a network interface (not shown). Over the network N2, the rendering devices 5 each receive a control command, original image data, or partial image data from the control PC 4. As shown in FIG. 5, the rendering devices 5 are each configured to include a CPU 51, which runs a control program stored in a memory 52 in accordance with the control command provided by the control PC 4. An image data processing section 53 then applies predetermined image data processing to the or image data or the partial image data provided by the control PC 4 so that the result, i.e., a second video signal, is forwarded to the projectors 3 over the signal lines S6 to S9.

The image data processing section 53 is configured to include a GPU (Graphics Processor Unit) or others, and in accordance with the control signal from the CPU 51, performs various types of image data processing. The image data processing includes a partial image data generation process of generating partial image data from the original image data received over the network N2, an image data correction process (will be described later) for the generated partial image data or the partial image data received over the network N2, or others. As shown in FIG. 5, this image data processing section 53 is provided with a partial image information generation section 531, an image correction section 532, or others. Although not shown specifically, the image data processing section 53 includes an image data storage section (not shown) for use as a storage area at the time of the above-described image data processing. This image data storage section is a portion of buffering the received image data, and may be a frame buffer for storing every image data of a screen, a line buffer for storing scanning data of a horizontal line, or others.

The partial image information generation section 531 performs an image data cut-out process and an image size change process in accordance with the control signal from the CPU 51, and generates partial image data, i.e., performs the partial image data generation process. The image data cut-out process is of cutting out image data of a predetermined area from the original image data, and the image size change process is of changing the size of the image data of the predetermined area being the cut-out result.

The image correction section 532 performs an image data correction process of correcting pixel color, intensity, resolution, or others using an image correction parameter stored in the memory 52. This image data correction process is applied to the partial image data generated by the partial image information generation section 531, or to the partial image data provided over the network N2.

The rendering devices 5 each forward, as a second video signal, the partial image data being the result of the image data processing in the image data processing section 53 to the projectors 3 over the signal lines S6 to S9.

Operation of Multi-Display System (Display Method)

Described next is the operation of the above-described multi-display system 1 by referring to the accompanying drawings.

In the below, the various types of display modes in accordance with the application use of the multi-display system 1 are described one by one, i.e., a real time mode, a high performance (Whole) mode, a high performance (Partial) mode, a first simple (Whole) mode, a first simple (Partial) mode, a second simple (Whole) mode, and a second simple (Partial) mode. In these display modes, any similar operation is provided with the same reference numeral, and not described in detail twice.

Real Time Mode

Figure 6:
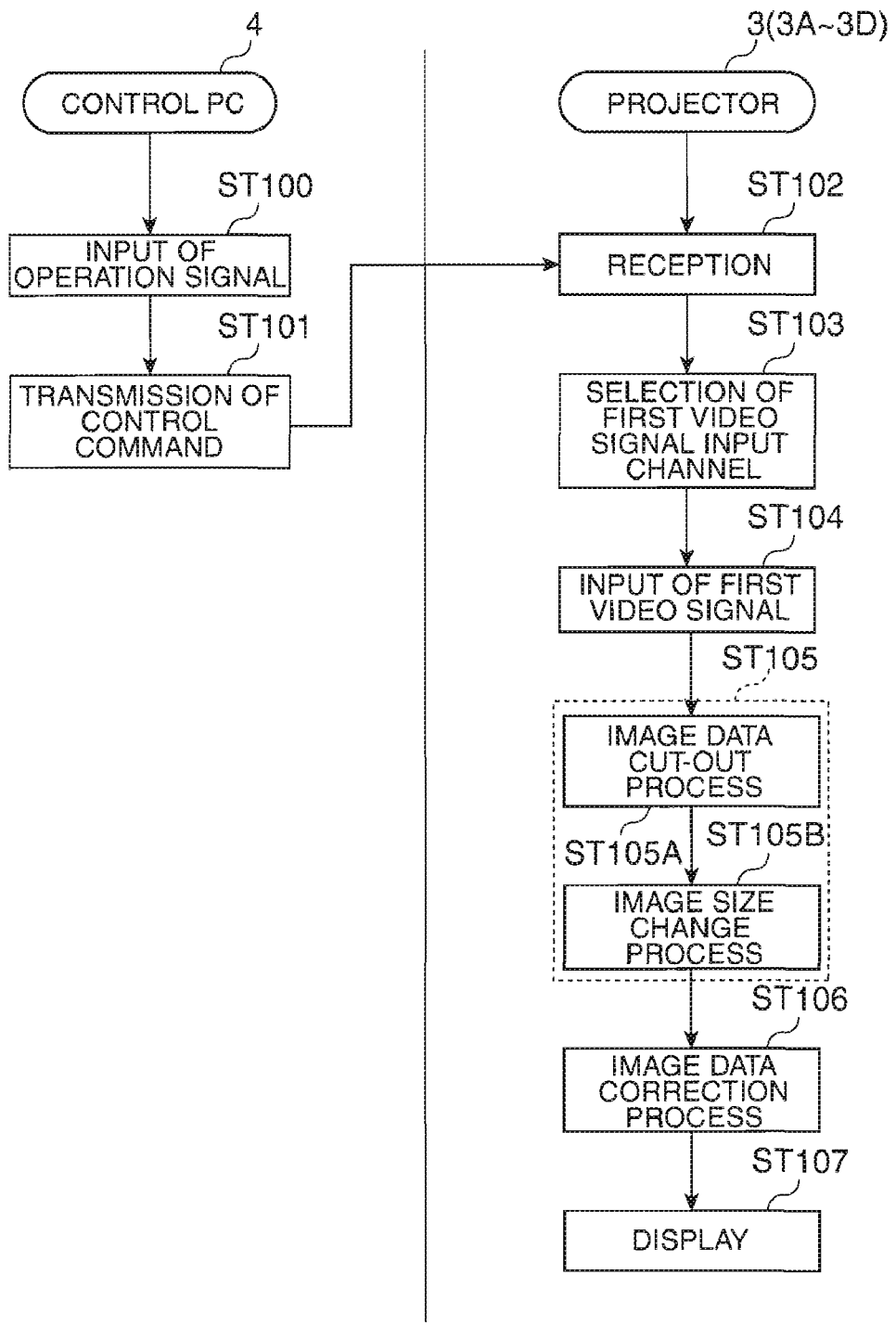
FIG. 6 is a flowchart for illustrating the operation of the multi-display system in a real time mode of the embodiment.

FIG. 6 is a flowchart for illustrating the operation of the multi-display system 1 in a real time mode.

In the below, exemplified is a case where a user performs a presentation using a notebook PC or others, and the image output device 2 is the notebook PC. In the case, a first video signal, e.g., analog RGB signal, provided from the notebook PC over the signal line S1 is assumed as being split in parallel for supply to the projectors 3 via the image signal splitter 2A and through the signal lines S2 to S5.

First of all, through input operation of selecting a "real time mode" made by a user to the operation section 41 of the control PC 4, a predetermined operation signal is forwarded to the PC body 43 from the control section 41. Thereafter, after the input of the operation signal, i.e., mode selection information, (step ST100; mode selection information acquisition step), the PC body 43 runs a control program stored in the memory 432 in accordance with the operation signal, and transmits a control command over the network N1 (step ST101: control command output step).

The control command is described as below.

That is, with the control command, the input channel selection section 322 of each of the projectors 3 is made to select the first video signal input channel 321A from a plurality of signal input channels 321, or the display control section 323 of each of the projectors 3 is made to perform image data processing, i.e., the partial image data generation process and the image data correction process, and to exercise display control.

The control command includes a parameter of processing requirements for use by the partial image information generation section 3231A of each of the projectors 3 to generate the partial image data.

The parameter of processing requirements varies for every processor 3. The control PC 4 thus forwards a parameter of processing requirements to each of the projectors 3 based on an IP (Internet Protocol) address assigned to each of the projectors 3 on the LAN being the N1, for example.

After step ST101, the projectors 3 each receive, through the network input channel 321C, the control command coming over the network N1 (step S102). The network input section 3212C applies predetermined signal processing to the received control command before output to the main control section 324. The main control section 324 then forwards, to the input channel selection section 322 and the display control section 323, a control signal corresponding to the provided control command. The input channel selection section 322 and the display control section 323 each perform the following processes in accordance with the provided control signal.

That is, the input channel selection section 322 selects the first video signal input channel 321A from a plurality of signal input channels 321 (step ST103: input channel selection step).

After step ST103, in each of the protectors 3, a first video signal, e.g., analog RGB signal, provided by the notebook PC is input via the first video signal input channel 321A, and is converted into a digital signal, i.e., original image data (step ST104: image information input step).

After step ST104, using the parameter of processing requirements found in the control command provided over the network N1, the partial image information generation section 3231A applies an image data cut-out process (step ST105A), and an image size change process (step ST105B) to the original image data provided by the first video signal input channel 321A so that the partial image data is generated (step ST105).

Figure 7:
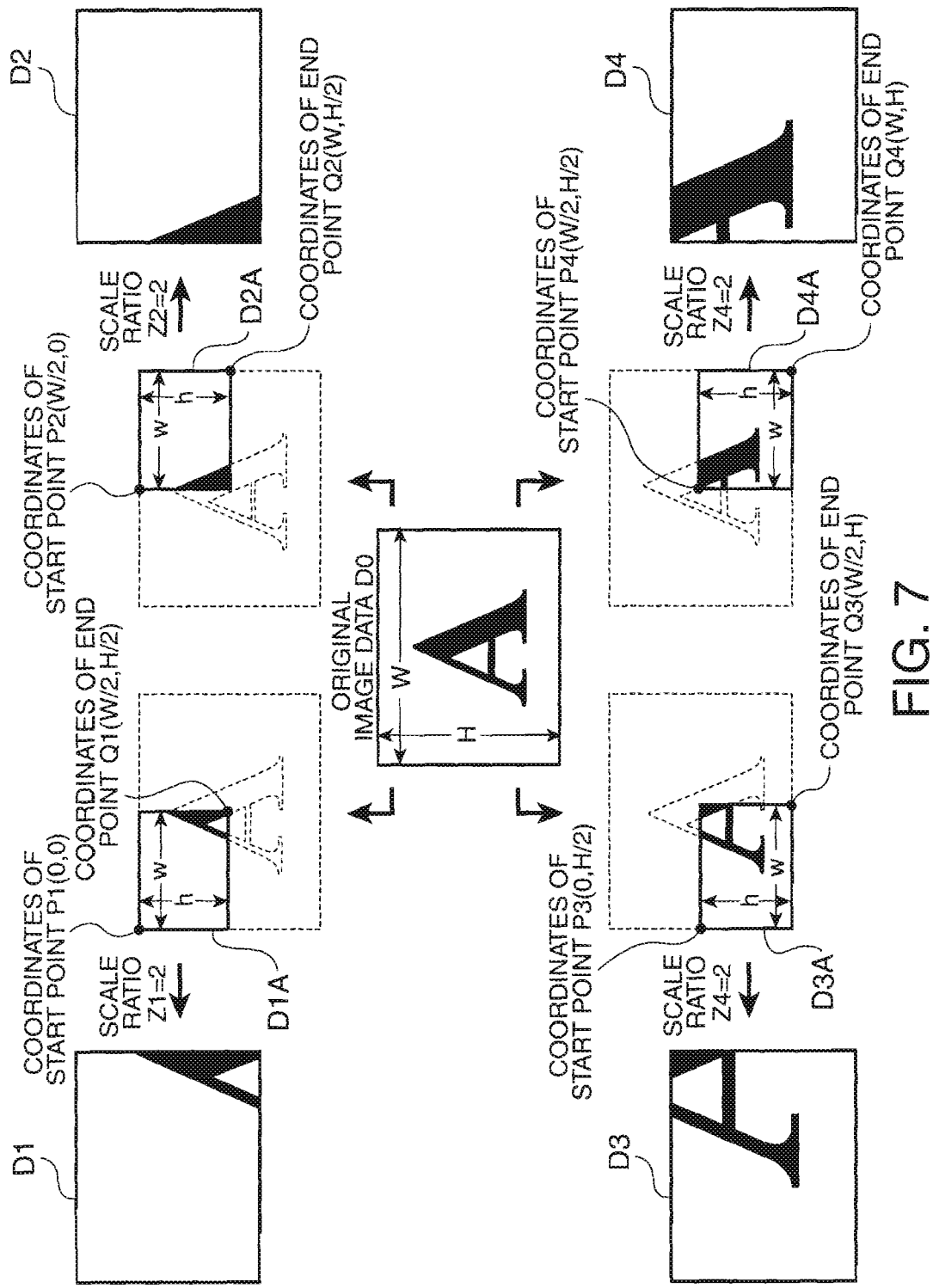
FIG. 7 is a diagram showing a partial image data generation process to be executed in a partial image information generation section in the embodiment.

FIG. 7 is a diagram showing a partial image data generation process to be performed by the partial image information generation section 3931A.

As shown in FIG. 7, the parameter of processing requirements is exemplified by information including coordinates of a start point and a scale ratio. The start point is of the range of the partial image data in the original image data, and the coordinates of the start point are exemplified by coordinates P (e.g., P1, P2, P3, and P4) for use to specify the cut-out start position, i.e., the upper left portion of the cutting-out rectangular area. The scale ratio is used to determine the scaling of the cut-out image data, and as shown in FIG. 7, a scale ratio Z is expressed by $Z=W/w=H/h$ where W denotes the horizontal resolution of the original image data D0, H denotes the vertical resolution thereof, w denotes the horizontal resolution of the cutting-out rectangular area, and h denotes the vertical resolution thereof. In this embodiment, the aspect ratio is assumed as being the same between the original image data and the cutting-out rectangular area, and the scale ratio Z (Z1, Z2, Z3, Z4)=2.

More specifically, the partial image information generation section 3231A of the projector 3A goes through step ST105 as described below, thereby generating partial image data D1 (FIG. 7).

That is, in step ST105A, the partial image information generation section 3231A calculates coordinates of an end point Q1 (W/2, H/2) based on the coordinates of the start point P1 (0, 0) and the scale ratio Z1. The coordinates of the start point are a parameter of processing requirements found in the control command provided over the network N1. The partial image information generation section 3231A cuts out image data D1A of the cutting-out range, which is set by the coordinates of the start point P1 read from the original image data D0 and the calculated coordinates of the end point Q1. Thereafter, in step ST105B, the partial image information generation section 3231A applies scaling to the cut-out image data D1A with the scale ratio Z1 so that the partial image data D1 is generated.

The partial image information generation section 3231A of the projector 3B goes through step ST105 as will be described below, thereby generating partial image data D2 (FIG. 7).

That is, in step ST105A, the partial image information generation section 3231A calculates coordinates of an end point Q2 (W, H/2) based on the coordinates of the start point P2 (W/2, 0) and the scale ratio Z2 (FIG. 7). The coordinates of the start point are a parameter of processing requirements found in the control command provided over the network N1. The partial image information generation section 3231A cuts out image data D2A of the cutting-out range, which is set by the coordinates of the start point P2 read from the original image data D0 and the calculated coordinates of the end point Q2. Thereafter, in step ST105B, the partial image information generation section 3231A applies scaling to the cut-out image data D2A with the scale ratio Z2 so that the partial image data D2 is generated.

The partial image information generation section 3231A of the projector 3C goes through step ST105 as will be described below, thereby generating partial image data D3 (FIG. 7).

That is, in step ST105A, the partial image information generation section 3231A calculates coordinates of an end point Q3 (W/2, H) based on the coordinates of the start point P3 (0, H/2) and the scale ratio Z3 (FIG. 7). The coordinates of the start point are a parameter of processing requirements found in the control command provided over the network N1. The partial image information generation section 3231A cuts out image data D3A of the cutting-out range, which is set by the coordinates of the start point P3 read from the original image data D0 and the calculated coordinates of the end point Q3. Thereafter, in step ST105B, the partial image information generation section 3231A applies scaling to the cut-out image data D3A with the scale ratio Z3 so that the partial image data D3 is generated.

The partial image information generation section 3231A of the projector 3D goes through step ST105 as will be described below, thereby generating partial image data D4 (FIG. 7).

That is, in step ST105A, the partial image information generation section 3231A calculates coordinates of an end point Q4 (W, H) based on the coordinates of the start point P4 (W/2, H/2) and the scale ratio z4 (FIG. 7). The coordinates of the start point are a parameter of processing requirements found in the control command provided over the network N1. The partial image information generation section 3231A cuts out image data D4A of the cutting-out range, which is set by the coordinates of the start point P4 read from the original image data D0 and the calculated coordinates of the end point Q4. Thereafter, in step ST105B, the partial image information generation section 3931A applies scaling to the cut-out image data D4A with the scale ratio Z4 so that the partial image data D4 is generated.

After step ST105, the image correction section 3231B applies an image data correction process such as gamma correction to the generated partial images D1 to D4 (step ST106).

After step ST106, the panel drive section 3232 generates a drive signal in accordance with the partial image data D1 to D4 through with the image data correction process. The resulting drive signals are forwarded to the liquid crystal light valves 312 so that the liquid crystal light valves 312 are formed with the partial images corresponding to the partial image data D1 to D4, respectively. Thereafter, the projectors 3A to 3D extend and project the partial images for projection onto the screen Sc so that an original image corresponding to the original image data D0 is displayed (step ST107: display step).

High Performance (Whole) Mode

Figure 8:
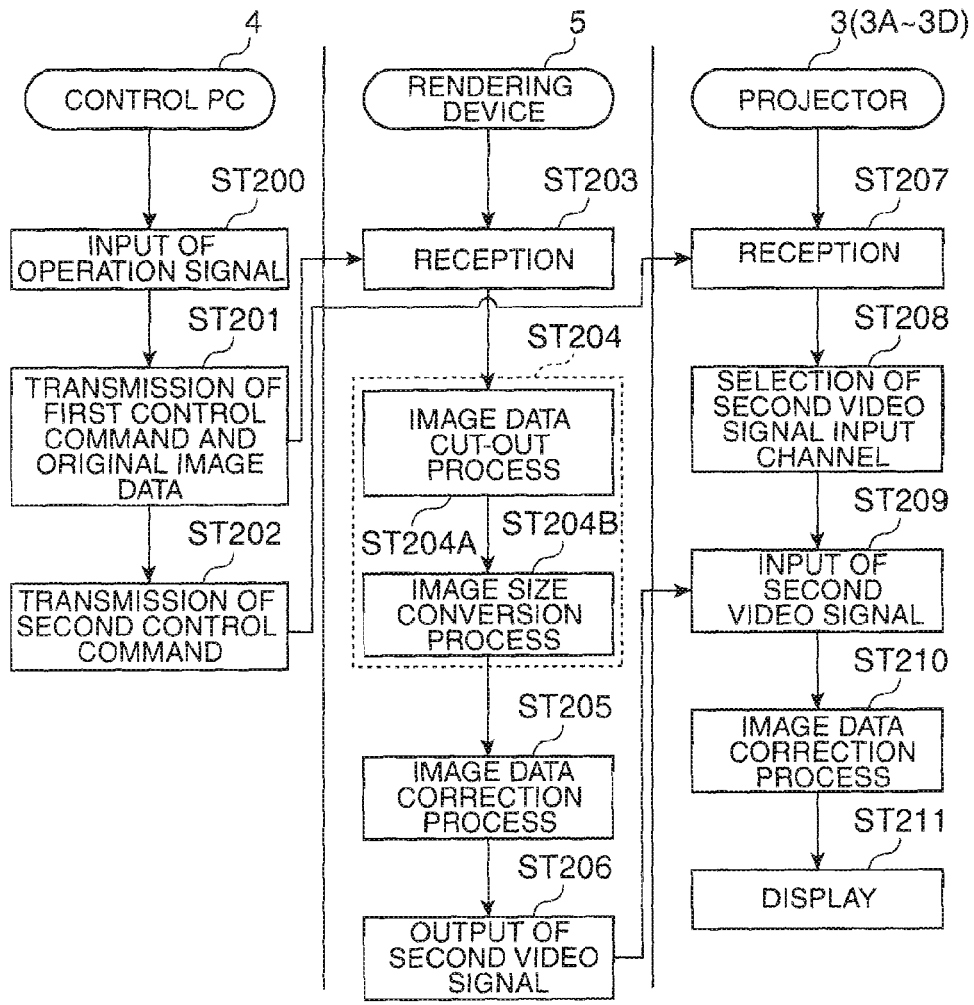
FIG. 8 is a flowchart for illustrating the operation of the multi-display system in a high performance (Whole) mode in the embodiment.

FIG. 8 is a flowchart for illustrating the operation of the multi-display system 1 in a high performance (Whole) mode.

In the below, the control PC 4 is assumed as reading, for use, the original image data D0 stored in a storage device such as hard disk, a recording medium such as DVD, or others (not shown).

First of all, in response to a user's input operation of the operation section 41 of the control PC 4 selecting a "high performance (Whole) mode", a predetermined operation signal is forwarded from the operation section 41 to the PC body 43. When receiving an operation signal, i.e., mode selection information (step ST200: mode selection information acquisition step), the PC body 43 runs a control program stored in the memory 432 in accordance with the operation signal, and forwards, over the network N2, a first control command and the original image data D0 read from the storage device or the recording medium (step ST201). The PC body 43 also forwards a second control command over the network N1 (step ST202: control command output step).

The first control command is as below.

That is, the first control command indicates to make each of the rendering devices 5 go through the image data processing, i.e., the partial image data generation process and the image data correction process, and includes a parameter of processing requirements for use by the partial image information generation sections 531 of each of the rendering devices 5 to generate the partial image data.

The parameter of processing requirements varies for every rendering device 5. The control PC 4 thus forwards a parameter of processing requirements to each of the rendering devices 5 based on an IP (Internet Protocol) address assigned to each of the rendering devices 5 on the LAN being the network N2, for example.

The second control command is as below.

That is, the second control command indicates to make each of the input channel selection sections 322 of the projectors 3 select the second video signal input channel 321B from a plurality of signal input channels 321, and makes each of the display control sections 323 of the projectors 3 perform the image data processing, i.e., the image data correction process, and exercise display control.

After step ST201, the rendering devices 5 each receive the first control command and the original image data provided over the network N2 (step ST203). The CPU 51 then forwards, to the image data processing section 53, a control signal corresponding to the received control command. The image data processing section 53 performs the following processes in accordance with the provided control signal.

That is, similarly to step ST105 described above, using the parameter of processing requirements found in the first control command provided over the network N2, the partial image information generation section 531 applies, to the received original image data D0, the image data cut-out process (step ST204A) and the image size change process (step ST204B) so that the partial image data D1 to D4 are generated (step ST204).

After step ST204, the image correction section 532 performs an image data correction process of correcting pixel color, intensity, resolution, or others with respect to the generated partial image data D1 to D4 (step ST205).

After step ST205, the rendering devices 5 each forward, as a second video signal (e.g., analog RGB signal), the partial image data D1 to D4 through with the image data processing to the projectors 3 over the signal lines S6 to S9 (step ST206).

After step ST202, the projectors 3 each receive, through the network input channel 321C, the second control command provided over the network N1 (step ST207). The network input section 3212C applies predetermined signal processing to the received control command, and forwards the processing result to the main control section 324. The main control section 324 then forwards a control signal corresponding to the received control command to the input channel selection section 322 and the display control section 323. The input channel selection section 322 and the display control section 323 perform the following processes in accordance with the provided control signal.

That is, the input channel selection section 322 selects the second video signal input channel 321B from a plurality of signal input channels 321 (step ST208: input channel selection step).

After step ST208, in each of the projectors 3, the second video signal provided from each of the rendering devices 5 in step ST206, e.g. analog RGB signals, are input via the second signal input channel 321B, and are then converted into digital signals, i.e., partial image data, (step T209: image information input step).

After step ST209, the image correction section 3231B applies an image data correction process such as gamma correction to the partial image data D1 to D4 provided by the second video signal input channel 321B (step ST210).

After step ST210, the panel drive section 3232 generates a drive signal in accordance with the partial image data D1 to D4 through with the image data correction process. The resulting drive signals are forwarded to the liquid crystal light valves 312 so that the liquid crystal light valves 312 are formed with the partial images corresponding to the partial image data D1 to D4, respectively. Thereafter, the projectors 3A to 3D extend and project the partial images for projection onto the screen Sc so that an original image corresponding to the original image data D0 is displayed (step ST211: display step).

High Performance (Partial) Mode

Figure 9:
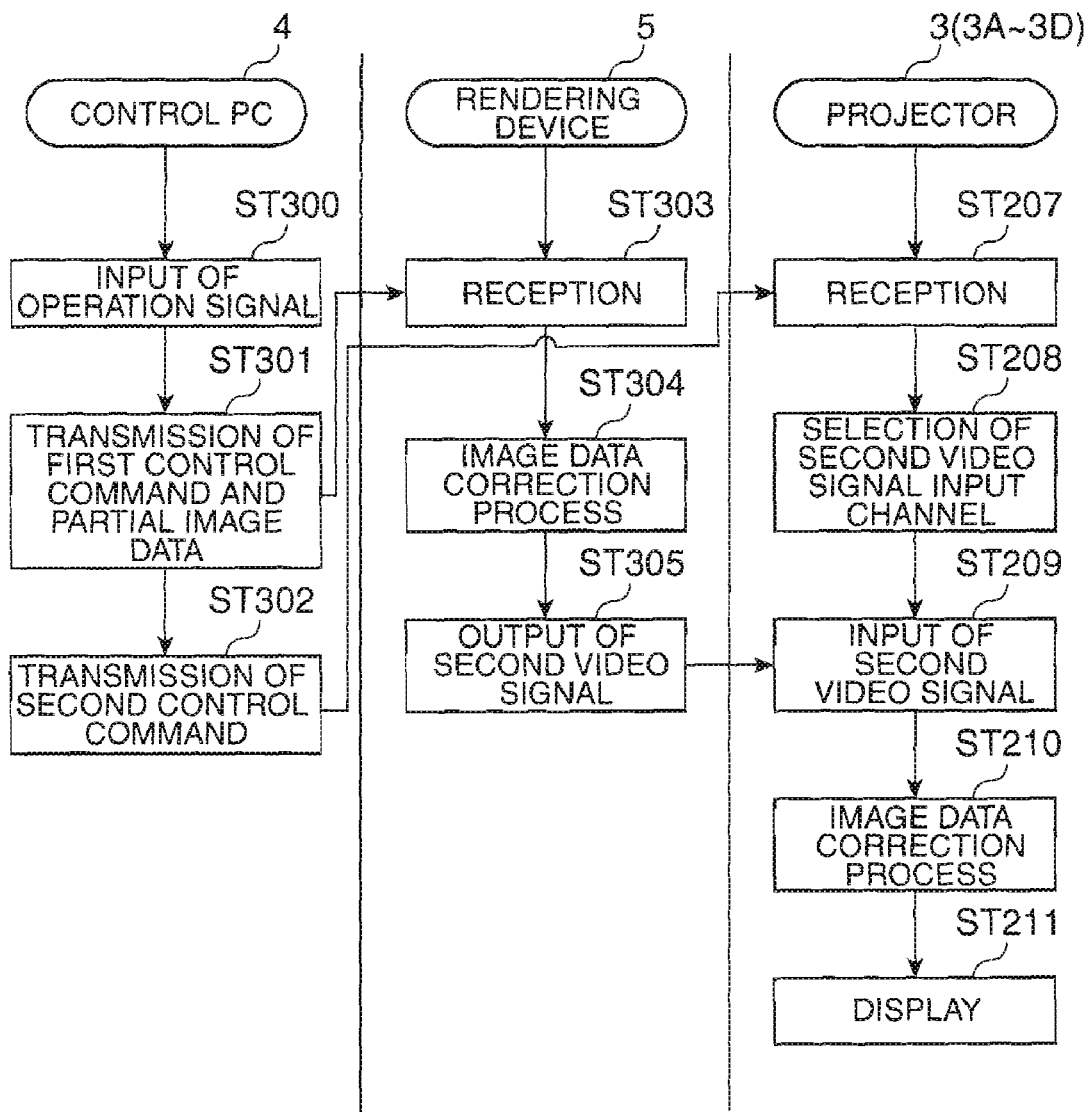
FIG. 9 is a flowchart for illustrating the operation of the multi-display system in a high performance (Partial) mode in the embodiment.

FIG. 9 is a flowchart for illustrating the operation of the multi-display system 1 in a high performance (Partial) mode.

In the below, the control PC 4 is assumed as reading, for use, the partial image data D1 to D4 stored in a storage device such as hard disk, a recording medium such as DVD, or others (not shown).

First of all, in response to a user's input operation of the operation section 41 of the control PC 4 selecting a "high performance (Partial) mode", a predetermined operation signal is forwarded from the operation section 41 to the PC body 43. When receiving an operation signal, i.e., mode selection information (step ST300: mode selection information acquisition step), the PC body 43 runs a control program stored in the memory 432 in accordance with the operation signal, and forwards, over the network N2, a first control command and the partial image data D1 to D4 read from the storage device or the recording medium (step ST301: control command output step). The PC body 43 also forwards a second control command over the network N1 (step ST302).

Note here that the partial image data D1 to D4 vary for every projector 3 (for every rendering device 5) as described above, and the control PC 4 thus forwards the partial image data D1 to D4 to each of the rendering devices 5 based on an IP (Internet Protocol) address assigned to each of the rendering devices 5 on the LAN being the network N2, for example.

The first control command is as below.

That is, the first control command indicates to make each of the rendering devices 5 go through the image data processing, i.e., the image data correction process.

The second control command is as below.

That is, the second control command indicates to make each of the input channel selection sections 322 of the projectors 3 select the second video signal input channel 321B from a plurality of signal input channels 321, and makes each of the display control sections 323 of the projectors 3 perform the image data processing, i.e., the image data correction process, and exercise display control.

After step ST301, the rendering devices 5 each receive the first control command and the partial image data D1 to D4 provided over the network N2 (step ST303). The CPU 51 then forwards, to the image data processing section 53, a control signal corresponding to the received control command. The image data processing section 53 performs the following processes in accordance with the provided control signal.

That is, the image correction section 53 performs an image data correction process of correcting pixel color, intensity, resolution, or others with respect to the generated partial image data D1 to D4 received over the network N2 (step ST304).

After step ST304, the rendering devices 5 each forward, as a second video signal, e.g., analog RGB signal, the partial image data D1 to D4 through with the image data processing to the projectors 3 over the signal lines S6 to S9 (step ST305).

After step ST302, in each of the projectors 3, similarly to the operation in the above-described high performance (Whole) mode, the second control command is received (step ST207), the second video signal input channel 321B is selected (step ST208), the second video signal is input (step ST209), and the image data correction process such as gamma correction is performed (step ST210). Thereafter, the partial images corresponding to the partial image data D1 to D4 are extended and projected so that an original image corresponding to the original image data D0 is displayed on the screen Sc (step ST211).

First Simple (Whole) Mode

Figure 10:
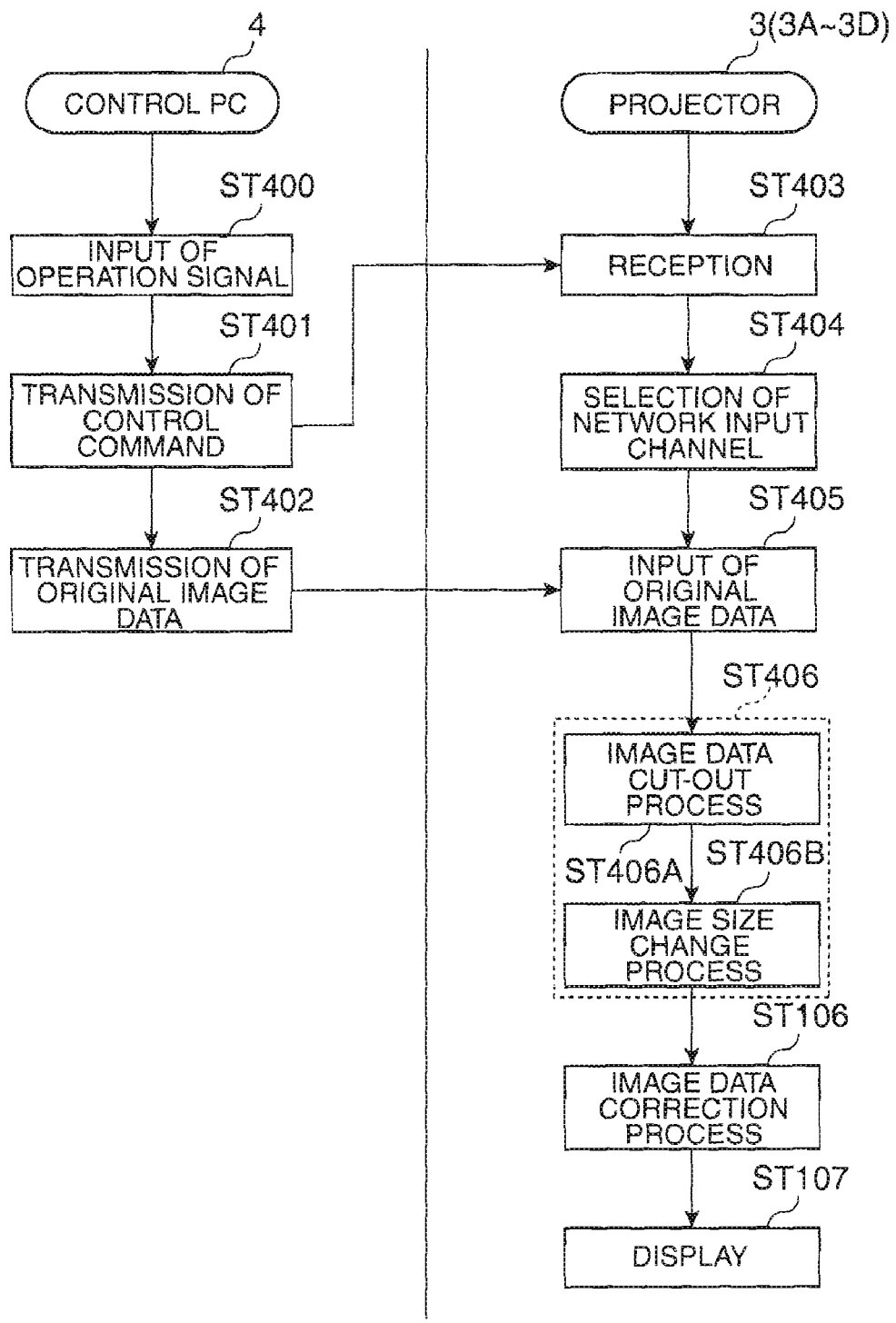
FIG. 10 is a flowchart for illustrating the operation of the multi-display system in a first simple (Whole) mode in the embodiment.

FIG. 10 is a flowchart for illustrating the operation of the multi-display system 1 in a first simple (Whole) mode.

In the below, the control PC 4 is assumed as reading, for use, the original image data D0 stored in a storage device such as hard disk, a recording medium such as DVD, or others (not shown).

First of all, in response to a user's input operation of the operation section 41 of the control PC 4 selecting a "first simple (Whole) mode", a predetermined operation signal is forwarded from the operation section 41 to the PC body 43. When receiving an operation signal, i.e., mode selection information (step ST400: mode selection information acquisition step), the PC body 43 runs a control program stored in the memory 432 in accordance with the operation signal, and forwards a control command over the network N1 (step S401 control command output step). The PC body 43 also forwards the original image data D0 read from the storage device or the recording medium (step ST402).

The control command is as below.

That is, the control command indicates to make each of the input channel selection sections 322 of the projectors 3 select the network input channel 321C from a plurality of signal input channels 321, and to make each of the display control sections 323 of the projectors 3 perform the image data processing, i.e., the partial image data generation process and the image data correction process, and exercise display control.

The control command includes a parameter of processing requirements, which is used by each of the partial image information generation sections 3231A of the projectors 3 to generate the partial image data.

This parameter of processing requirements varies for every projector 3 as described above. The control PC 4 thus forwards a parameter of processing requirements to each of the projectors 3 based on an IP (Internet Protocol) address assigned to each of the projectors 3 on the LAN being the network N1, for example.

After step ST401, the projectors 3 each receive, through the network input channel 321C, the control command provided over the network N1 (step ST403). The network input section 3212C applies predetermined signal processing to the received control command, and then forwards the result to the main control section 324. The main control section 324 then forwards a control signal corresponding to the received control command to the input channel selection section 322 and the display control section 323. The input channel selection section 322 and the display control section 323 then perform the following processes in accordance with the provided control signal.

That is, the input channel selection section 322 selects the network input channel 321C from a plurality of signal input channels 321 (step ST404: input system selection step).

After step ST404, in each of the projectors 3, the original image data provided over the network N1 in step ST402 is input over the network input channel 321C, and then is subjected to decoding (step ST405: image information input step).

After step ST405, similarly to the above-described steps ST105 and ST204, using the parameter of processing requirements found in the control command provided over the network N1, the partial image information generation section 3231A applies, to the original image data D0 provided via the network input channel 321C, the image data cut-out process (step ST406A) and the image size change process (step ST406B) so that the partial image data D1 to D4 are generated (step ST406).

After step ST406, in each of the projectors 3, similarly to the operation in the above-described real time mode, the generated partial image data D1 to D4 are subjected to the image data correction process such as gamma correction (step ST106), and the partial images corresponding to the partial image data D1 to D4 are extended and projected so that an original image corresponding to the original image data D0 is displayed on the screen Sc (step ST107).

First Simple (Partial) Mode

Figure 11:
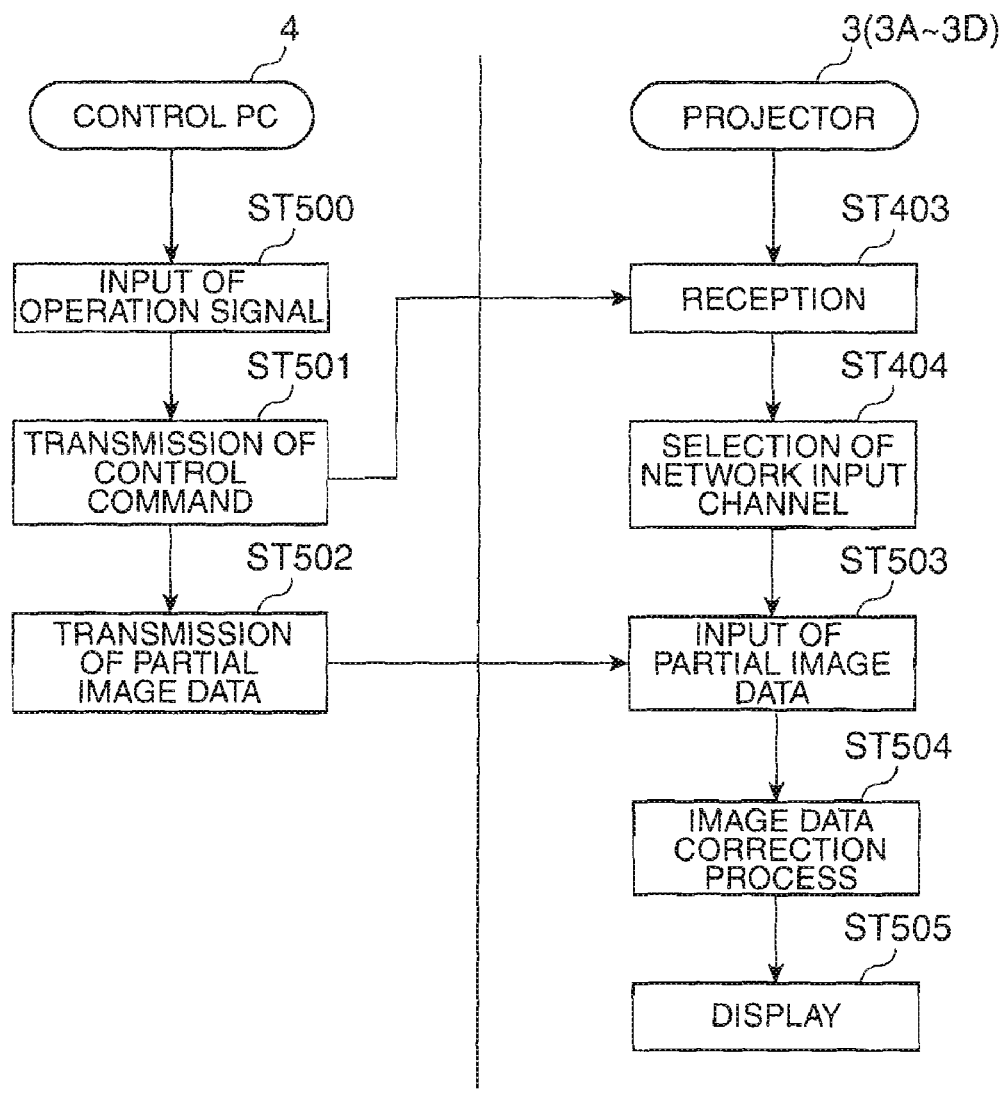
FIG. 11 is a flowchart for illustrating the operation of the multi-display system in a first simple (Partial), mode in the embodiment.

FIG. 11 is a flowchart for illustrating the operation of the multi-display system 1 in a first simple (Partial) mode.

In the below, the control PC 4 is assumed as reading, for use, the partial image data D1 to D4 stored in a storage device such as hard disk, a recording medium such as DVD, or others (not shown).

First of all, in response to a user's input operation of the operation section 41 of the control PC 4 selecting a "first simple (Partial) mode", a predetermined operation signal is forwarded from the operation section 41 to the PC body 43. When receiving an operation signal, i.e., mode selection information (step ST500: mode selection information acquisition step) the PC body 43 runs a control program stored in the memory 432 in accordance with the operation signal, and forwards a control command over the network N1 (step S501: control command output step). The PC body 43 also forwards the partial image data D1 to D4 read from the storage device or the recording medium (step ST502).

Note here that, as described above, the partial image data D1 to D4 vary for every projector 3, and the control PC 4 thus forwards the partial image data D1 to D4 to each of the projectors 3 based on an IP (Internet Protocol) address assigned to each of the projectors 3 on the LAN being the network N1, for example.

The control command is as below.

That is, the control command indicates to make each of the input channel selection sections 322 of the projectors 3 select the network input channel 321C from a plurality of signal input channels 321, and to make each of the display control sections 323 of the projectors 3 perform the image data processing, i.e., the image data correction process, and exercise display control.

After step ST501, in each of the projectors 3, similarly to the operation in the above-described first simple (Whole) mode, the control command is received (step ST403), and the network input channel 321C is selected (step ST404).

After step ST404, in each of the projectors 3, the partial image data D1 to D4 provided over the network N1 in step ST502 are input over the network input channel 321C, and then are subjected to decoding (step ST503: image information input step).

After step ST503, the image correction section 3231B applies the image data correction process such as gamma correction to the partial image data D1 to D4 output through the network input channel 321C (step ST504).

After step ST504, the panel drive section 3232 generates a drive signal corresponding to the partial image data D1 to D4 through with the image data correction process. The resulting drive signals are forwarded to the liquid crystal light valves 312 so that the liquid crystal light valves 312 are formed with the partial images corresponding to the partial image data D1 to D4, respectively. Thereafter, the projectors 3A to 3D extend and project the partial images for projection onto the screen Sc so that an original image corresponding to the original image data D0 is displayed (step ST505: display step).

Second Simple (Whole) Mode

Figure 12:
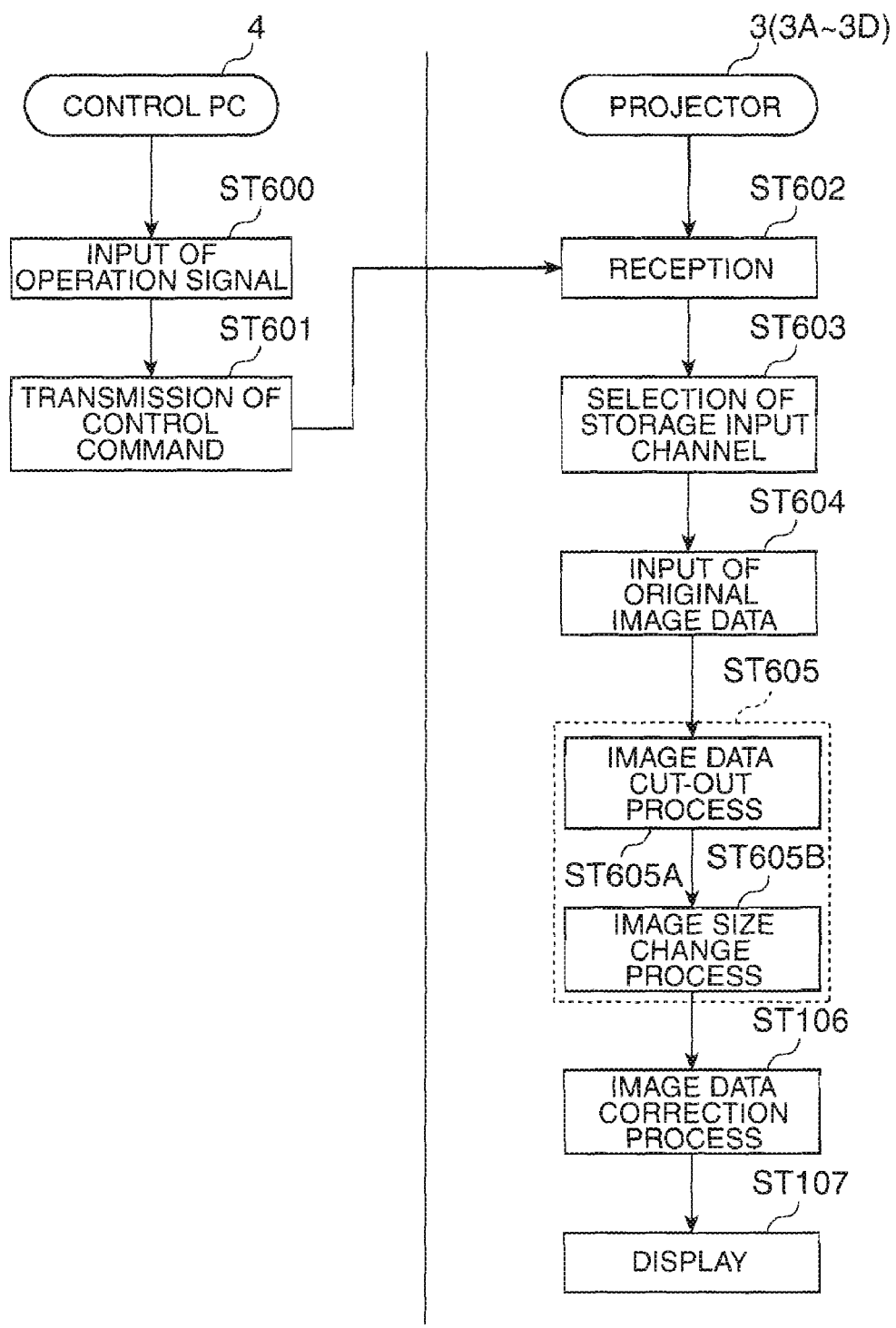
FIG. 12 is a flowchart for illustrating the operation of the multi-display system in a second simple (Whole) mode in the embodiment.

FIG. 12 is a flowchart for illustrating the operation of the multi-display system 1 in a second simple (Whole) mode.

In the below, presumably, the USB memories 6 are each carrying therein the original image data D0, and are each connected to the storage input terminal 3211D of any of the corresponding projector 3.

First of all, in response to a user's input operation of the operation section 41 of the control PC 4 selecting a "second simple (Whole) mode", a predetermined operation signal is forwarded from the operation section 41 to the PC body 43. When receiving an operation signal, i.e., mode selection information (step ST600: mode selection information acquisition step), the PC body 43 runs a control program stored in the memory 432 in accordance with the operation signal, and forwards a control command over the network N1 (step ST601: control command output step).

The control command is as below.

That is, the control command indicates to make each of the input channel selection sections 322 of the projectors 3 to select the storage input channel 321D from a plurality of signal input channels 321, make each of the USB memories 6 to read the original image data D0, make the display control sections 323 of the projectors 3 to perform image data processing, i.e., the partial image data generation process and the image data correction process, to the original data D0 read from each of the USB memories 6 or to exercise display control thereover.

The control command includes a parameter of processing requirements for use by the partial image information generation section 3231A of each of the projectors 3 to generate the partial image data.

The parameter of processing requirements varies for every processor 3. The control PC 4 thus forwards a parameter of processing requirements to each of the projectors 3 based on an IP (Internet Protocol) address assigned to each of the projectors 3 on the LAN being the network N1, for example.

After step ST601, the projectors 3 each receive, through the network input channel 321C, the control command coming over the network N1 (step ST602. The network input section 3212C applies predetermined signal processing to the received control command before output to the main control section 324. The main control section 324 then forwards, to the input channel selection section 322, the storage input section 3212D, and the display control section 323, a control signal corresponding to the provided control command. These components, i.e., the input channel selection section 322, the storage input section 3212D, and the display control section 323 each perform the following processes in accordance with the provided control signal.

That is, the input channel selection section 322 selects the storage input channel 321D from a plurality of signal input channels 321 (step ST603: input channel selection step).

After step ST603, the storage input section 3212D reads the original image data D0 stored in the USB memory 6 connected to the storage input terminal 3211D, and applies decoding to the original image data D0 (step ST604: image information input step).

After step ST604, similarly to the above-described steps ST105, ST204, and ST406, using the parameter of processing requirements found in the control command provided over the network N1, the partial image information generation section 3231A applies the image data cut-out process (step ST605A), and the image size change process (step ST605B) to the original image data D0 provided by the storage input channel 321D so that the partial image data D1 to D4 are generated (step ST605).

After step ST605, in each of the projectors 3, similarly to the operation in the real time mode described above, the generated partial image data D1 to D4 are subjected to the image data correction process such as gamma correction (step ST106). The partial images corresponding to the partial image data D1 to D4 are then extended and projected so that an original image corresponding to the original image data D0 is displayed on the screen Sc (step ST107).

Second Simple (Partial) Mode

Figure 13:
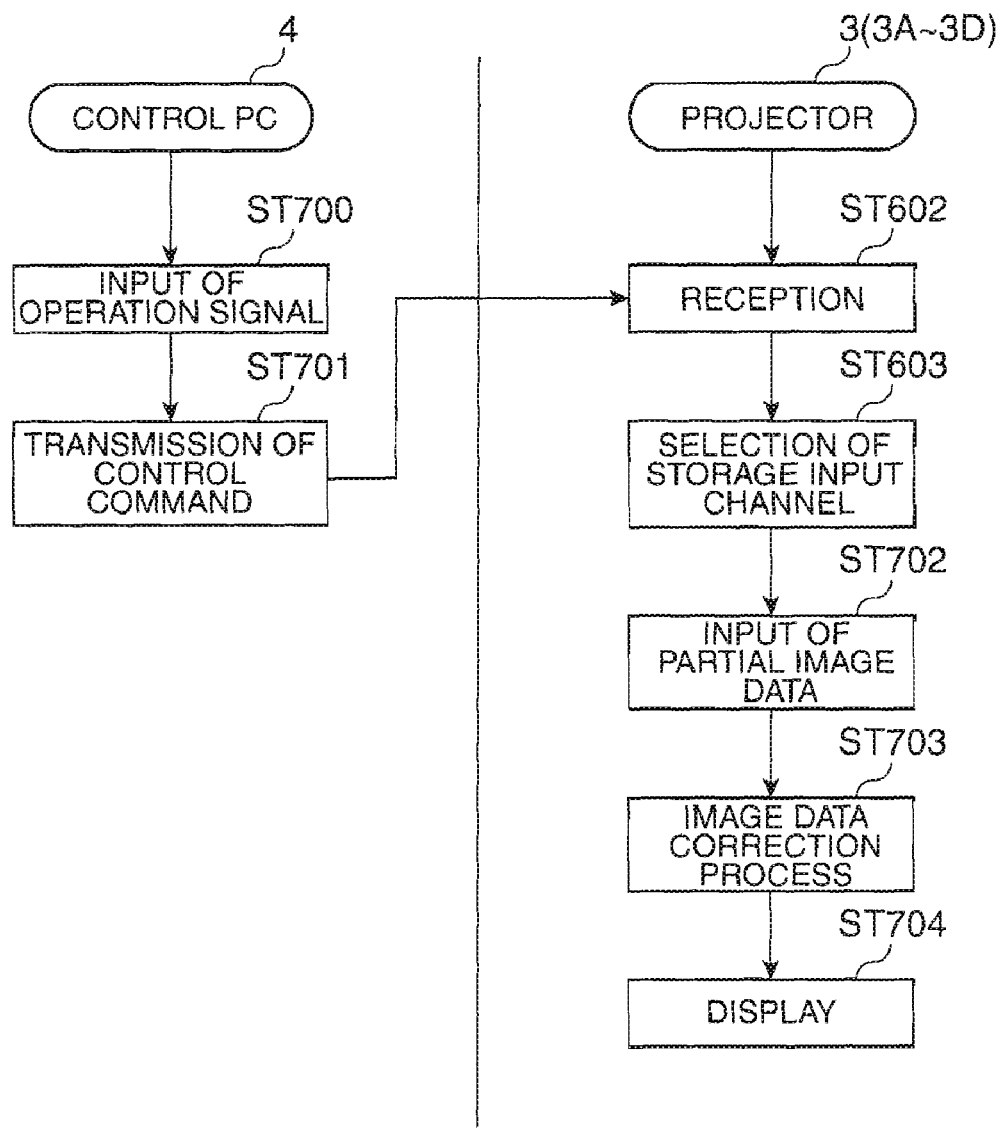
FIG. 13 is a flowchart for illustrating the operation of the multi-display system in a second simple (Partial) mode in the embodiment.

FIG. 13 is a flowchart for illustrating the operation of the multi-display system 1 in a second simple (Partial) mode.

In the below, presumably, the USB memories 6 are each carrying therein the partial image data D1 to D4, and are each connected to the storage input terminal 3211D of its corresponding projector 3 corresponding to the partial image data D1 to D4 in storage.

First of all, in response to a user's input operation of the operation section 41 of the control PC 4 selecting a "second simple (Partial) mode", a predetermined operation signal is forwarded from the operation section 41 to the PC body 43. When receiving operation signal, i.e., mode selection information (step ST700: mode selection information acquisition step), the PC body 43 runs a control program stored in the memory 432 in accordance with the operation signal, and forwards a control command over the network N1 (step ST701: control command output step).

The control command is as below.

That is, the control command indicates to make each of the input channel selection sections 322 of the projectors 3 select the storage input channel 321D from a plurality of signal input channels 321, make each of the USB memories 6 read the partial image data D1 to D4, make the display control sections 323 of the projectors 3 perform image data processing, i.e., the image data correction process, to the partial image data D1 to D4 read from each of the USB memories 6 or exercise display control thereover.

After step ST701, similarly to the operation in the second simple (Whole) mode described above, in each of the projectors 3, the control command is received (step ST602, and the storage input channel 321D is selected (step ST603).

After step ST603, the storage input section 3212D reads the partial image data D1 to D4 stored in the USB memory 6 connected to the storage input terminal 3211D, and applies decoding to the partial image data D1 to D4 (step ST702: image information input step).

After step ST702, the image correction section 3231B applies the image data correction process such as gamma correction to the partial image data D1 to D4 output through the storage input channel 321D (step ST703).

After step ST703, the panel drive section 3232 generates a drive signal corresponding to the partial image data D1 to D4 through with the image data correction process. The resulting drive signals are forwarded to the liquid crystal light valves 312 so that the liquid crystal light valves 312 are formed with the partial images corresponding to the partial image data D1 to D4, respectively. Thereafter, the protectors 3A to 3D extend and project the partial images for projection onto the screen Sc so that an original image corresponding to the original image data D0 is displayed (step ST704: display step.

As such, in the embodiment, in response to selection of any predetermined display mode through user operation of the operation section 41 of the control PC 4, the multi-display system 1 operates in accordance with the selected display mode.

According to the embodiment described above, the following effects and advantages can be achieved.

In the embodiment, the multi-display system 1 is configured to include: a plurality of signal input channels 321; the input channel selection section 322; the projectors 3 each including the display control section 323; and the control PC 4 for control over the protectors 3. With such a configuration, only by a user selecting a display mode in accordance with his or her wanting application use, the multi-display system 1 accordingly operates in the selected display mode. The multi-display system 1 is thus available for various types of application uses, e.g., when the real-time characteristics are required for use for presentations or others, when the display of an original image is made with a high resolution, or when the multi-display system is to be operated with small resources, thereby favorably increasing the customer convenience.

The display devices are each exemplified by the projector 3. Using projectors for the display devices as such enables to minimize the need for adding any new hardware so that the multi-display system 1 can be implemented with low cost. This is because a general projector is equipped with a plurality of signal input channels, and utilizing the signal input channels effectively will derive such effects.

In the real time mode, the multi-display system 1 is so operated as to go through signal processing for the hierarchy of a first video signal, and there thus is no need for data conversion such as compression and decoding during the operation. As such, a delay is not caused that much, and if for a presentation using a slide file on a notebook PC selected for use as the image output device 2, a user finds a good response when he or she makes a screen change through operation of the notebook PC, for example. That is, with the real time mode selected from a plurality of display modes, the multi-display system 1 can work optimally when the real-time characteristics are required for a presentation or others. Moreover, there is no need to use the rendering devices 5 or others, i.e., there is no need to turn on the rendering devices 5, the multi-display system 1 can be operated with low cost in terms of power consumption.

In the high performance (Whole) mode and the high performance (Partial) mode, the rendering devices 5 (personal computers) are each capable of graphic processing, and thus can apply high-accuracy image processing to the partial image data D1 to D4, e.g., image processing of changing pixel color, intensity, resolution, or others, so that the resulting partial image information can be of high resolution. That is, because each of the projectors 3 displays a partial image based on the high-resolution partial image data D1 to D4 on the screen Sc, the entire screen as an assembly of a plurality of partial screens can display thereon an original image with higher resolution. That is, with the high performance mode selected from a plurality of display modes, the multi-display system 1 can work optimally when an original image is to be displayed with high resolution.

Moreover, using personal computers for the rendering devices 5 enables, with ease, addition of functions, e.g., software addition and update, after the multi-display system 1 is constructed.

Further, in the first simple ( Whole) mode and the first simple (Partial) mode, there is no need to use the rendering devices 5 or others, i.e., there is no need to turn on the rendering devices 5, the multi display system 1 can be operated with low cost in terms of power consumption. That is, with the first simple mode selected from a plurality of display modes, the multi-display system 1 can work optimally when the multi-display system 1 is desirably operated with small resources.

The image information, i.e., the original image data D0 or the partial image data D1 to D4, is forwarded as a digital signal to each of the projectors 3 over the network N1, thereby causing no signal degradation that is often caused to analog video signals by cable leading.

Still further, in the second simple (Whole) mode and the second simple (Partial) mode, there is no need to use the rendering devices 5 or others, i.e., there is no need to turn on the rendering devices 5, the multi-display system 1 can be operated with low cost in terms of power consumption. That is, with the second simple mode selected from a plurality of display modes, the multi-display system 1 can work optimally when the multi-display system 1 is desirably operated with small resources.

The image information, i.e., the original image data D0 or the partial image data D1 to D4, is forwarded as a digital signal to each of the projectors 3, thereby causing no signal degradation that is often caused to analog video signals by cable leading.

What is more, the multi-display system 1 can be implemented only by the projectors 3, the USB memories 6, and the control PC 4. Accordingly, if with an application use not requiring frequent content change, the multi-display system 1 can be operated with lower cost.

Note here that the invention is not restricted above descriptions of the embodiment, and it is understood that other possible modifications and variations that can implement the aspects of the invention are included in the invention.

In the embodiment, described are the configurations of implementing the operation in the seven display modes, i.e., the real time mode, the high performance (Whole) mode, the high performance (Partial) mode, the first simple (Whole) mode, the first simple (Partial) mode, the second simple (Whole) mode, and the second simple (Partial) mode. These are not surely restrictive, and the possible configuration is of implementing the operation in the seven or more display modes additionally with other display modes, or implementing the operation in at least the two or more of the seven display modes.

In the embodiment, the number of the projectors 3 is four. This is surely not restrictive, and the number of the projectors 3 may be two, three, or five or more. This is applicable to the rendering devices 5.

Described in the embodiment is an original image being configured by partial images with no overlapping thereamong. This is surely not restrictive, and an original image may be configured by partial images partially overlapping one another.

With this being the case, preferably, the portions where the partial images are overlapping are adjusted by brightness for the aim of making the overlapped portions less conspicuous. For example, the brightness of the overlapped portions among the partial images is optically adjusted, i.e., the amount of light is partially adjusted using a light shield for the partial images to be subjected to extended projection. As another example, for the image data corresponding to the overlapped portions of the partial image data is subjected to an image correction process of adjusting the brightness, i.e., intensity and color.

In the embodiment, the networks N1 and N2 are wired by the signal lines S10 to S19 such as LAN cables, but the networks are not necessarily wired, and may be wireless such as radio LAN.

In the embodiment, in the first simple (Whole) mode and the first simple (Partial) mode, the control PC 4 is so configured as to transmit image data, i.e., the original image data and the partial image data, over the network N2. This is surely not the only option, and for example, the rendering devices 5 may read and use image data stored in a storage device such as hard disk or a recording medium such as DVD.

In the configuration of the embodiment, a parameter of processing requirements is transmitted from the control PC 4 to the projectors 3 and the rendering devices 5. This is surely not restrictive, and the projectors 3 and the rendering devices 5 may each store therein a parameter of processing requirements for use.

In the embodiment, in the real time mode, the projectors 3 are described as each generating the partial image data, but this is surely not restrictive.

Figure 14:
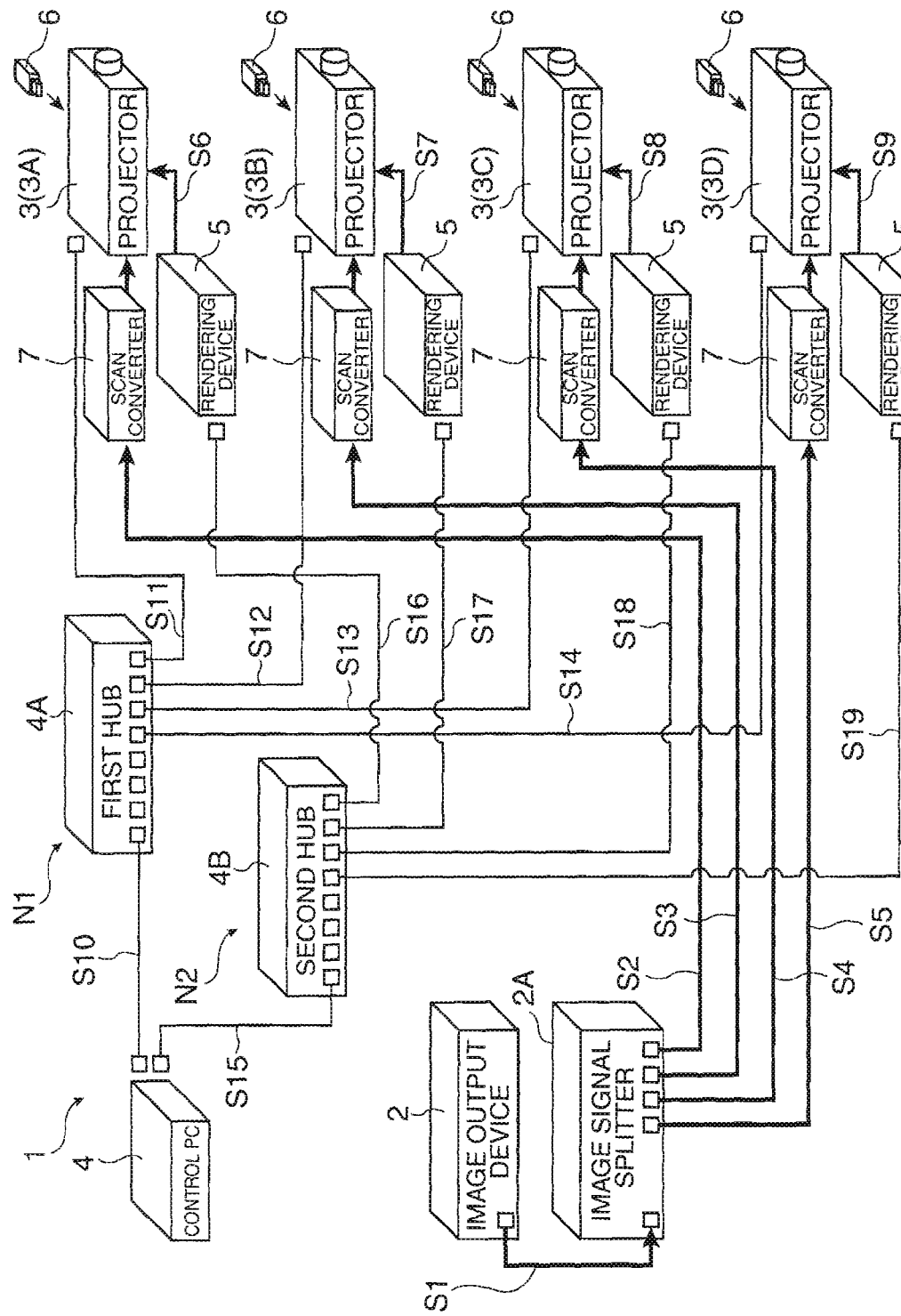
FIG. 14 is a diagram showing a modified example of the embodiment.

FIG. 14 is a diagram showing a modified example of the above embodiment.

As shown in FIG. 14, for example, a scan converter 7 is disposed between the image signal splitter 2A and each of the projectors 3. Although not shown in FIG. 14, the scan converter 7 is connected to the control PC 4 over a network, and in accordance with a control command coming from the control PC 4, applies processing similar to that, in step ST105 to a first video signal, i.e., original image data, provided from the image signal splitter 2A. The result, i.e., the partial image data, is then forwarded to the projectors 3.

In the embodiment, a liquid crystal panel of a translucent type, i.e., the liquid crystal light valve 312, is used. This is surely not the only option, and another possible option is a liquid crystal panel of a reflective type or a Digital Micromirror Device (trademark of Texas Instruments).

In the embodiment, the number of the liquid crystal light valves 312 is three. This is surely not the only option, and an alternative possible configuration may include only one, two, or four or more of the liquid crystal light valve 312.

In the embodiment, the display device is exemplified by a projector. This is surely not restrictive, and the display device may be a direct-view-type display, e.g., plasma display, liquid crystal display, and CRT (Cathode-Ray Tube).

While the best configuration or others for implementing the invention have been described in the above, the foregoing description is in all aspects illustrative and not restrictive. That is, the invention is made apparent mainly for a specific embodiment when taken in conjunction with the accompanying drawings, but it is understood that numerous other modifications and variations can be devised by those skilled in the art in terms of shape, material, volume, and any other details without departing from the scope of the invention.

As such, the descriptions of the embodiment with the limited shape, material, and others, is no more than an example provided for the aim of facilitating the understanding of the invention, and the invention is not surely restrictive thereto. The descriptions, by name, of components without partially or entirely, such restrictions in terms of shape, material, and others are included in the invention.

Since the invention can be applied to various types of application uses and achieve the increase of customer convenience, it can be used in a multi-display system which is provided with a plurality of display devices each displaying a partial image constituting at least a part of an original image of a screen and displays the original image with the respective partial images displayed by the plurality of display devices.

The entire disclosure of Japanese Patent Application No. 2006-215388, filed Aug. 8, 2006 is expressly incorporated by reference herein.

What is claimed is:

1. A multi-display system comprising:
   a plurality of display devices that each display a partial image being at least a part of an original image, display the original image by the partial images, and include:
      a plurality of signal input channels that are each provided with an input terminal for receiving image information about the original image or the partial image, and are each set in accordance with a signal format of the provided image information;
      an input channel selection section that selects any of the signal input channels in accordance with a predetermined control command, and makes an input of the image information via the selected signal input channel; and a display control section that applies, in accordance with the predetermined control command, predetermined image processing to the received image information, and makes a display section display thereon the partial image; and a control device that exercises control over the display devices by providing the display devices with the predetermined control command, that acquires mode selection information indicating which of a plurality of display modes is selected in accordance with an application use of the multi-display system, that outputs the predetermined control command to the display devices based on the acquired mode selection information, and that makes the input channel selection section of each of the display devices select any of the signal input channels corresponding to the mode selection information, and display the partial image in the display mode corresponding to the mode selection information.

2. The multi-display system according to claim 1, further comprising an image signal output device that outputs the image information to each of the display devices as a first video signal, wherein the control device outputs, when acquiring the mode selection information indicating to select a real time mode from the display modes, the predetermined control command to the display devices, and makes the input channel selection section of each of the display devices select any of the input channels for the first video signal corresponding to the real time mode, and display the partial image in the real time mode, and in each of the display devices, the signal input channels are each configured to include a first video signal input channel for use to receive the first video signal provided by the image signal output device, and in accordance with the predetermined control command when the control device acquires the mode selection information indicating to select the real time mode, the input channel selection section selects the first video signal input channel, and makes an input of the first video signal, and the display control section generates the partial image by applying an image data cut-out process to the first video signal, and makes the display section display thereon the partial image.

3. The multi-display system according to claim 1, further comprising:

a plurality of rendering devices that each form partial image information about the partial image based on the image information, apply predetermined image processing to the partial image information, and output the partial image information through with the image processing to each of the display devices as a second video signal, wherein the control device outputs, when acquiring the mode selection information indicating to select a high performance mode from the display modes, the predetermined control command to the display devices, and makes the input channel selection section of each of the display devices select the input channel for the second video signal corresponding to the high performance mode, and display the partial image in the high performance mode, and in each of the display devices, the signal input channels are each configured to include a second video signal input channel for use to receive the second video signal provided by any of the corresponding rendering devices, and in accordance with the predetermined control command when the control device acquires the mode selection information indicating to select the high performance mode, the input channel selection section selects the second video signal input channel, and makes an input of the second video signal, and the display control section makes the display section display thereon the partial image being the second video signal.

4. In the multi-display system according to claim 1, further comprising a network to enable transmission of the image information to the display devices as a first digital signal, wherein the control device outputs, when acquiring the mode selection information indicating to select a first simple mode from the display modes, the predetermined control command to the display devices, makes the input channel selection section of each of the display devices select the input channel for the network corresponding to the first simple mode, and display partial image in the first simple mode, in each of the display devices the signal input channels are each configured to include a network input channel for use to receive the first digital signal over the network, and in accordance with the predetermined control command when the control device acquires the mode selection information indicating to select the first simple mode, the input channel selection section selects the network input channel, and makes an input of the first digital signal, and the display control section generates the partial image by applying an image data cut-out process to the first digital signal, and makes the display section display thereon the partial image.

5. The multi-display system according to claim 1, further comprising a plurality of storage devices that each store the image information, and output the image information to each of the display devices as a second digital signal, wherein the control device outputs, when acquiring the mode selection information indicating to select a second simple mode from the display modes, the predetermined control command to the display devices, makes the input channel selection section of each of the display devices select the input channel for the storage devices corresponding to the second simple mode, and display the partial image in the second simple mode, and in each of the display devices, the signal input channels are each configured to include a storage input channel for use to receive the second digital signal provided from any of the corresponding storage devices, and in accordance with the predetermined control command when the control device acquires the mode selection information indicating to select the second simple mode,
the input channel selection section selects the storage input channel, and makes an input of the second digital signal, and
the display control section generates the partial image by applying an image data cut-out process to the second digital signal, and makes the display section display thereon the partial image.

6. A display method using a multi-display system, wherein the multi-display system includes:
a plurality of display devices that each display a partial image being at least a part of an original image of a screen, and display the original image with the partial images displayed by the remaining display devices; and
a control device that exercises control over the display devices, and
the display method comprises:
acquiring, by the control device, mode selection information indicating to select any of a plurality of display modes in accordance with an application use of the multi-display system;
outputting, by the control device, a control command to the display devices based on the acquired mode selection information;
selecting, by each of the display devices, in accordance with the control command from the control device, any of a plurality of signal input channels corresponding to the selected display mode;
receiving, by each of the display devices, image information about the original image or the partial image via the selected signal input channel; and
applying, by each of the display devices, predetermined image processing to the provided image information for display, on a display section, of the partial image in the selected display mode.

7. A display device, comprising:
a plurality of signal input channels that each include an input terminal for receiving image information about an original image or a partial image being at least a part of the original image of a screen, and are each set in accordance with a signal format of the provided image information;
an input channel selection section that selects any of the signal input channels in accordance with a predetermined control command from a control device, and makes an input of the image information via the selected signal input channel; and
a display control section that applies, in accordance with the predetermined control command, predetermined image processing to the provided image information, and makes a display section display thereon the partial image.

8. The display device according to claim 7, wherein
the signal input channels are each configured to include a first video signal input channel for use to receive a first video signal provided by an image signal output device, and
in accordance with the predetermined control command when the control device acquires mode selection information indicating to select a real time mode,
the input channel selection section selects the first video signal input channel, and makes an input of the first video signal, and
the display control section generates the partial image by applying an image data cut-out process to the first video signal, and makes the display section display thereon the partial image.

9. The display device according to claim 7, wherein
the signal input channels are each configured to include a second video signal input channel for use to receive a second video signal provided by a rendering device, and
in accordance with the predetermined control command when the control device acquires mode selection information indicating to select a high performance mode,
the input channel selection section selects the second video signal input channel, and makes an input of the second video signal, and
the display control section makes the display section display thereon the partial image being the second video signal.

10. The display device according to claim 7, wherein
the signal input channels are each configured to include a network input channel for use to receive a first digital signal over a network, and
in accordance with the predetermined control command when the control device acquires mode selection information indicating to select a first simple mode,
the input channel selection section selects the network input channel, and makes an input of the first digital signal, and
the display control section generates the partial image by applying an image data cut-out process to the first digital signal, and makes the display section display thereon the partial image.

11. The display device according to claim 7, wherein
the signal input channels are each configured to include a storage input channel for use to receive a second digital signal provided by a storage device, and
in accordance with the predetermined control command when the control device acquires mode selection information indicating to select a second simple mode,
the input channel selection section selects the storage input channel, and makes an input of the second digital signal, and
the display control section generates the partial image by applying an image data cut-out process to the second digital signal, and makes the display section display thereon the partial image.

* * * * *